(12) United States Patent
Thompson

(10) Patent No.: US 9,031,058 B2
(45) Date of Patent: *May 12, 2015

(54) SYSTEM FOR INTERCONNECTING STANDARD TELEPHONY COMMUNICATIONS EQUIPMENT TO INTERNET

(75) Inventor: Joseph B. Thompson, Orange Beach, AL (US)

(73) Assignee: Bear Creek Technologies, Inc., Orange Beach, AL (US)

( * ) Notice: Subject to any disclaimer, the term of this patent is extended or adjusted under 35 U.S.C. 154(b) by 167 days.

This patent is subject to a terminal disclaimer.

(21) Appl. No.: 13/301,541

(22) Filed: Nov. 21, 2011

(65) Prior Publication Data

US 2012/0127917 A1 May 24, 2012

Related U.S. Application Data

(63) Continuation of application No. 13/027,232, filed on Feb. 14, 2011, which is a continuation of application No. 11/253,129, filed on Oct. 18, 2005, now Pat. No. 7,889,722, which is a continuation of application No.

(Continued)

(51) Int. Cl.
*H04L 12/64* (2006.01)
*H04N 1/32* (2006.01)
(Continued)

(52) U.S. Cl.
CPC ...... *H04N 1/32427* (2013.01); *H04L 29/06027* (2013.01); *H04M 7/1205* (2013.01);
(Continued)

(58) Field of Classification Search
USPC .......................................... 370/352
See application file for complete search history.

(56) References Cited

U.S. PATENT DOCUMENTS 4,771,425 A 9/1988 Baran et al.
4,935,953 A 6/1990 Appel et al.
(Continued)

FOREIGN PATENT DOCUMENTS

| JP | H5-14407 A | 1/1993 |
|---|---|---|
| JP | H5-103127 A | 4/1993 |
| WO | 9726753 A1 | 7/1997 |

OTHER PUBLICATIONS

Newton's Telecom Dictionary, Flatiron Publishing, Ninth Edition, Sep. 1995, definition of "Facsimile equipment", pp. 1, 462-465.*

(Continued)

*Primary Examiner* — Melvin Marcelo
(74) *Attorney, Agent, or Firm* — Capitol City TechLaw; Richard C. Irving

(57) ABSTRACT

Apparatus includes a communication predelivery receiver, configured to communicate with and relay both IP addressed overhead and IP addressed payload data from an originating communication device. The communication predelivery receiver includes a screener configured to, when the communication predelivery receiver is in communication with the originating communication device, receive certain data including first IP addressed data and second IP addressed data of corresponding first and second initiated communications. The communication predelivery receiver is configured and connected within a network so the first IP addressed data and the second IP addressed data are processed differently. For the first initiated communication, the first payload data is converted, after the point in time at which the screener received the first IP addressed data, from IP addressed first payload data to another network signal. For the second initiated communication, the second payload data is delivered without so converting the second payload data.

41 Claims, 17 Drawing Sheets

Related U.S. Application Data

10/770,808, filed on Feb. 3, 2004, now Pat. No. 6,985,494, which is a continuation of application No. 10/279,645, filed on Oct. 24, 2002, now abandoned, which is a continuation of application No. 08/812,745, filed on Mar. 6, 1997, now abandoned.

(60) Provisional application No. 60/012,896, filed on Mar. 6, 1996, provisional application No. 60/013,240, filed on Mar. 11, 1996.

(51) Int. Cl.

| | | |
|---|---|---|
| *H04L 29/06* | (2006.01) | |
| *H04M 7/12* | (2006.01) | |
| *H04L 12/58* | (2006.01) | |
| *H04M 3/533* | (2006.01) | |
| *H04N 1/00* | (2006.01) | |

(52) U.S. Cl.
CPC .......... *H04L65/605* (2013.01); *H04L 65/1063* (2013.01); *H04L 65/1053* (2013.01); *H04L 65/1073* (2013.01); *H04L 12/5835* (2013.01); *H04L 51/066* (2013.01); *H04M 3/533* (2013.01); *H04N 1/0022* (2013.01); *H04N 1/32406* (2013.01); *H04N 2201/0067* (2013.01); *H04N 2201/0093* (2013.01)

(56) References Cited

U.S. PATENT DOCUMENTS

| | | | |
|---|---|---|---|
| 4,958,341 A | 9/1990 | Hemmady et al. | |
| 4,969,184 A | 11/1990 | Gordon et al. | |
| 5,280,540 A | 1/1994 | Addeo et al. | |
| 5,333,266 A | 7/1994 | Boaz et al. | |
| 5,339,156 A | 8/1994 | Ishii | |
| 5,430,473 A | 7/1995 | Beecher, II et al. | |
| 5,436,893 A | 7/1995 | Barnett | |
| 5,438,357 A | 8/1995 | McNelley | |
| 5,475,421 A | 12/1995 | Palmer et al. | |
| 5,481,542 A | 1/1996 | Logston et al. | |
| 5,488,651 A | 1/1996 | Giler et al. | |
| 5,604,737 A | 2/1997 | Iwami et al. | |
| 5,608,786 A | 3/1997 | Gordon | |
| 5,610,910 A | 3/1997 | Focsaneanu et al. | |
| 5,654,957 A | 8/1997 | Koyama | |
| 5,712,907 A | 1/1998 | Wegner et al. | |
| 5,726,984 A | 3/1998 | Kubler et al. | |
| 5,729,544 A | 3/1998 | Lev et al. | |
| 5,740,231 A | 4/1998 | Cohn et al. | |
| 5,742,596 A | 4/1998 | Baratz et al. | |
| 5,742,670 A | 4/1998 | Bennett | |
| 5,742,905 A | 4/1998 | Pepe et al. | |
| 5,774,527 A | 6/1998 | Handelman et al. | |
| 5,781,620 A * | 7/1998 | Montgomery et al. | .. 379/114.02 |
| 5,805,587 A | 9/1998 | Norris et al. | |
| 5,812,278 A | 9/1998 | Toyoda et al. | |
| 5,818,911 A | 10/1998 | Kawashima | |
| 5,862,134 A | 1/1999 | Deng | |
| 5,867,495 A | 2/1999 | Elliott et al. | |
| 5,881,233 A | 3/1999 | Toyoda et al. | |
| 5,907,598 A | 5/1999 | Mandalia et al. | |
| 5,910,946 A | 6/1999 | Csapo | |
| 5,923,659 A | 7/1999 | Curry et al. | |
| 5,940,479 A | 8/1999 | Guy et al. | |
| 5,940,598 A | 8/1999 | Strauss et al. | |
| 5,999,525 A | 12/1999 | Krishnaswamy et al. | |
| 6,026,086 A | 2/2000 | Lancelot et al. | |
| 6,064,653 A | 5/2000 | Farris | |
| 6,069,890 A | 5/2000 | White et al. | |
| 6,078,582 A | 6/2000 | Curry et al. | |
| 6,104,711 A | 8/2000 | Voit | |
| 6,108,329 A | 8/2000 | Oyama et al. | |
| 6,125,113 A | 9/2000 | Farris et al. | |
| 6,141,345 A | 10/2000 | Goeddel et al. | |
| 6,157,636 A | 12/2000 | Voit et al. | |
| 6,173,044 B1 | 1/2001 | Hortensius et al. | |
| 6,205,135 B1 | 3/2001 | Chinni et al. | |
| 6,215,858 B1 | 4/2001 | Bartholomew et al. | |
| 6,243,373 B1 | 6/2001 | Turock | |
| 6,347,085 B2 | 2/2002 | Kelly | |
| 6,377,576 B1 | 4/2002 | Zwick | |
| 6,438,124 B1 | 8/2002 | Wiles et al. | |
| 6,600,733 B2 | 7/2003 | Deng | |
| 6,600,750 B1 | 7/2003 | Joffe et al. | |
| 6,954,453 B1 | 10/2005 | Schindler et al. | |
| 6,985,494 B2 | 1/2006 | Thompson | |
| 7,336,649 B1 | 2/2008 | Huang | |
| 7,889,722 B2 | 2/2011 | Thompson | |
| 2001/0040885 A1 | 11/2001 | Jonas et al. | |
| 2003/0053447 A1 | 3/2003 | Thompson | |
| 2003/0236846 A1 | 12/2003 | Fukushima | |

OTHER PUBLICATIONS

Brochure, "Dianatel Ultra Platform", Dianatel Digital Analog Telephony, 96 Bonaventura Drive, San Jose, CA 95134.

Brochure, "DigiPhone™ Deluxe—The Complete Internet Phone System", Third Planet Publishing, 17770 Preston Road, Dallas, Texas 75252, (214) 733-3005.

Pamphlet, Who's Zoomin' Who?, Issues, May 13, 1996, pp. 55-62.

Faxaway Frequently Asked Questions, World Wide Rate Sheet, printed Feb. 28, 1996 8:28 am., pp. 4-7.

The Phone Company (TPC.INT), An Experiment in Remote Printing, printed on Feb. 28, 1996 10:04 am.

An Experiment in Remote Printing (FAQ), printed on Feb. 28, 1996 10:06 am, pp. 1-9.

Malamud & Rose, Principles of Operation for the TPC.INT Subdomain: General Principles and Policy, Oct. 1993, printed from rfc1530.txtatftp.internic.net(FTP) on Feb. 28, 1996 10:06 am, pp. 1-7.

Malamud & Rose, Principles of Operation for TPC.INT Subdomain: Remote Printing—Technical Procedures, Oct. 1993, printed from rfc1528.txtatftp.internic.net (FTP) on Feb. 28, 1996 10:07 am, pp. 1-11.

Rose, Principles of Operation for TPC.INT Subdomain: Radio Paging—Technical Procedures, Jan. 1994, printed from rfc1569.txtaftp.internic.net (FTP) on Feb. 28,1996 10:07 am, pp. 1-6.

Rose, Principles of Operation for TPC.INT Subdomain: Radio Paging—Technical Procedures, Oct. 1994, printed from rfc1703.txtatftp.internic.net (FTP) on Feb. 28, 1996 10:07 am, pp. 1-11.

Octel—Procedures & Services—OcteLink, OcteLink, printed from http://www.octel.com/PS/octelink.html#wnjc on Jan. 19, 1996 11:03:44, pp. 1-5.

Octel—Products & Services—Fax Access/Fax Broadcast, Fax Broadcast, printed from http://www.octel.com/PS/europe.faxbroadcast.htm on Jan. 19, 1996 10:56:33, pp. 1-2.

Digital Sound Corporation, Fax Messaging and Overflow, printed from http://polaris.dsc.com/prodNservices/softwareLine/faxovfl.html on Jan. 19, 1996 10:53:13 pp. 1-3.

Gamma Fax (800) 755-4444 and Rhetorex (408) 370-0881, p. 2.

Malamud & Rose, Principles of Operation for the TPC.INT Subdomain: Remote Printing—Administrative Policies, Oct. 1993, printed from rfc1529.txtatftp.internic.net(FTP) on Feb. 28, 1996 10:07 am, pp. 1-5.

The FaxMail Service, FastQuote™ Now On-Line, printed from http://www.actrix.qen.nz/biz/faxmail/faxmail.htm on Feb. 13, 1996 10:24:28 3 pages.

Interpage™ Network Services Group, Interpage Network Services Group Fax Services, printed from http://interpage.net/faxinq/faxindex.html on Feb. 13, 1996 10:31:15 1 page.

Interpage™ Network Services Group, Summary of Interpage's Fax-based services:, printed from http://interpage.net/faxinq/interpage-fax on Feb. 13, 1996 10:32:10 pp. 1-3.

Interpage™ Network Services Inc. Fax Services, InFax/OutFax Configuration Information, printed from http://interpage.net/faxing/interpage-fax-config-info on Feb. 13, 1996 10:32:43 pp. 1-4.

(56) References Cited

OTHER PUBLICATIONS

Interpage™ Network Services Group, Interpage—"Fax Free Trial Form", printed from http://www.interpage.net/faxinq/interpage-fax-trial on Feb. 13, 1996 10:34:05 pp. 1-4.
Interpage™ Network Services, Inc.—FaxUp/FaxUp WWW(SM), Service Overview and Rates, http://www.interpage.net/faxinq/interpage-faxup-info , Feb. 13, 1996 10:34:05.
Octel-Products & Services—Fax Access/Fax Broadcast, Fax Access, printed from http://www.octel.com/PS/europe.faxaccess.html on Jan. 19, 1996 10:55:29, pp. 1-2.
Dialogic Products Descriptions, pp. 1-6.
Catalog, Dialogic, Voice Processing & Computer Telephony Applications, Nov./Dec. 1994, Dialogic Corporation, 1515 Route 10, Parsippany, NJ 07054, pp. 1-23.
Dave Dix, America Online: JohnPorp, Wired 2.05 Features—American Gladiators: A T&T and MCI Face Off, Jan. 11, 1996, pp. 1-7.
America Online: JohnPorp, Department: The Information Revolution: The Information Economy: Overview, Issue: May 18, 1994, The Digital Juggernaut, pp. 1-6.
America Online: JohnPorp, Department: Special Report, Issue: Sep. 26, 1994, The Global Free-For-All as Huge New Telecom Markets Open, Carriers Aim to Carve Up the World, pp. 1-7.
FCC Releases Report on Long Distance Market, printed from http://www.fxx.gov/Bure ...sReleases/nrcc5071.txt on Jan. 11, 1996 14:39:47 1 page.
FWD Project Manager, The Free World Dialup Project . . . At the Crossroads, printed from http://www.pulver.com on Mar. 5, 1997 3:37:09 pm, pp. 1-3.
Brian McConnell, Pacific Telephony Design, How to Build an Internet PBX, printed from http://www.phonezone.com/ip-phone.htm Mar. 5, 1997, 20 pages.
Voice on the Net®Spring '97, Gateway Workshop, printed from the Gateway Home Page, Mar. 5, 1997 2:41:04 pm, 6 pages.
Technology Viewpoint, New Computer Telephony Integration: Does Your Organization Have the Backbone to Succeed?, vol. 9, No. 7, Mar. 30, 1996, pp. 1-6.
Omega 5 PBX Data Gateway, PBX Data Gateway, printed Mar. 3, 1997 12:53:48 pm, pp. 1-2.
Bonny Georgia, Internet Calling, PC Computing, Feb. 1997, p. 134.
Networking Personal Computer with TCP/IP, Mar. 4, 1997 6:58:49 pm, p. 1 of 1.
SBE-TCP/IP Local Area Network Communications Software Package, Mar. 4, 1997 7:03:42 pm, pp. 1-10.
Microsoft NetMeeting Questions and Answers, 1997 Microsoft Corporation, Mar. 4, 1997 7:10:36 pm, p. 1 of 1.
R. Scott Raynovich, IPX-to-IP Products Proliferate, Dyanmic addressing simplifies NetWare internet connections, Mar. 4, 1997 6:42:32 pm, pp. 1-3.
Michelle Rae McLean, AT&T Offers TCP/IP for PBX, Software and circuit board provide direct connection to LAN, Lantimes Online Jul. 24, 1995, Mar. 4, 1997 6:34:48 pm, pp. 1-2.
Ching-Wen Chung, Voice Over the Internet: Internet Telephone, Computer and Information Science University of Pennsylvania, Apr. 2, 1996, printed Mar. 3, 1997 12:06: 10 pm, pp. 1-9.
Lycos search: internet voice, Safety Net, Mar. 3, 1997 12:03:31 pm, pp. 1-3.
Vicky Hardman and Mark Handley, Reliable Audio for Use over the Internet, printed Mar. 3, 1997 12:17:32 pm, pp. 1-13.
Mike Milla, It's the Net's Best Thing to Being There, The Washington Post, Jan. 23, 1996.
"Ourfax: World Wide Free Internet Email to Fax", http://www.ourfax.com/faq/index.htm, printed Aug. 2, 2002, published 2000, pp. 1-2.
"Ourfax: World Wide Free Internet Email to Fax", http://www.ourfax.com/press/index.htm, printed Aug. 8, 2002, published 2000, p. 1.
"TPC.INT Coverage List: Remote Printing Coverage List", http://www-usa.tpc.int/fax_cover_auto_html, printed Aug. 8, 2002, published 2002, pp. 1-10.

"FACSys ThruFax—Extend the Functionality of FACSys with Automatic Fax-to-Email Conversion", http://www.facsys.com/products/FACSysThruFax.htm, printed Mar. 14, 2003, published 2001, p. 1.
"Space Tec: Your Independent Source for iSeries/AS/400 Software, FACSys Web Agent", http://www.spacetec.co.uk/products/FaxSys/newpage7.htm, printed Mar. 14, 2003, published 2002, 2003 SpaceTec, pp. 1-2.
C. Malamud (Internet Multicasting Service), M. Rose. (Dover Beach Consulting, Inc.), "Principles of Operation for the TPC.INT Subdomain: General Principles and Policy", http://www-usa.tpc.int/rfc/rfc1530.txt, printed Aug. 8, 2002, published 1993, pp. 1-7.
C. Malamud (Internet Multicasting Service), M. Rose. (Dover Beach Consulting, Inc.), "Principles of Operation for the TPC.INT Subdomain: Remote Printing-Administrative Policies", http://www-usa.tpc.int/rfc/rfc1529.txt, printed Aug. 8, 2002, published 1993, pp. 1-5.
"VocalTec's Telephony Gateway—The Ultimate Internet Telephony Solution?", Computer Telephony, pp. 30, 32 and 34-35. Sep. 1996.
C. Malamud (Internet Multicasting Service), M. Rose. (Dover Beach Consulting, Inc.), "Principles of Operation for the TPC.INT Subdomain: Remote Printing—Technical Procedures", http://www-usa.tpc.int/rfc/rfc1528.txt, printed Aug. 8, 2002, published 1993, pp. 1-12.
Harry Newton, "Newton's Telecom Dictionary", 10th Edition, Feb. 1996, pp. 617-618.
Harry Newton, "Newton's Telecom Dictionary", 11th Edition, Jul. 1996, p. 316.
Harry Newton, "Newrton's Telecom Dictionary", 9th Edition, Sep. 1995, p. 745.
U.S. Patent and Trademark Office; Board of Patent Appeals and Interferences Decision on Appeal for Inter Partes Reexamination Control 95/001,030; U.S. Patent No. 6,985,494; mailed Sep. 29, 2011.
Shane Sondreal; Request for Ex parte Reexamination of U.S. Patent No. 7,889,722; filed in the U.S. Patent and Trademark Office on Mar. 8, 2012.
U.S. Patent and Trademark Office; Office Action in Ex Parte Reexamination for Control No. 90/012,180; U.S. Patent No. 7,889,722; mailed Apr. 26, 2012.
Jeffrey D. Karceski; Response to Office Action in Ex Parte Reexamination for Control No. 90/012,180; U.S. Patent No. 7,889,722; filed in the U.S. Patent and Trademark Office on Jul. 26, 2012.
U.S. Appl. No. 60/012,896, filed Mar. 6, 1996.
U.S. Appl. No. 08/812,745, filed Mar. 6, 1997.
U.S. Appl. No. 60/013,240, filed Mar. 11, 1996.
Detreville, John D. et al, "A Distributed Experimental Communication System", Advances in Local Area Networks, IEEE Press, 1987.
Swinehart, Daniel C., Telephone Management in the Etherphone System, Xerox PARC, CSL-89-2, May 1989.
"The Internet, Changing the Way We Communicate", http://www.nsf.gov/about/history/nsf0050/pdf/internet.pdf (1988).
Vat: Change History, http://ee.lbl.gov/vat/CHANGES.html (May 1996).
"VocalTec's Internet Telephony Gateway" Computer Telephony, http://archive.bibalex.org/web/19961225003116/vocaltec.com/ctarticle.htm (Dec. 1996).
"VocalTec Unveils Strategy to Bridge Old World of Telephony and New World of Internet Telephony; Launches First Bridging Applications", VocalTec Press Release, Aug. 1, 1996.
Weinstein, Clifford et al., "Packet Speech Systems Technology", MIT, Lincoln Laboratory, Semiannual Technical Summary Report to the Defense Advanced Research Projects Agency, Lexington, MA, Jul. 10, 1981.
Zellweger, Polle T., "Active Paths through Multimedia Documents", Xerox PARC, CSL-89-2, May 1989.
"Computer History Museum, Exhibits, Internet History, 1970's" http://www.computerhistory.org/internet_history/internet_history_70s.html.
Sylvia, Dennis, "VocalTec Unveils Real World Internet Telephony", Newsbytes, Aug. 30, 1996.
Postel, J.; Internet Protocol, DARPA Internet Program Protocol Specification: Request for Comments (RFC) 791; Information Sciences Institute; Sep. 1981, pp. 1-45.

(56) References Cited

OTHER PUBLICATIONS

Postel, J.; "Transmission Protocol, DARPA Internet Program Protocol Specification" Request for Comments (RFC) 793; Information Sciences Institute; Sep. 1981, pp. 1-85.

"VocalTec Telephony Gateway" Features http://archive.bibalex.org/web/19961225015630/vocaltec.com/products/gtw/features.htm (Jun. 6, 1997).

"VocalTec Telephony Gateway" Calling Options http://archive.bibalex.org/web/19961225004234.vocaltec.com/products/gtw/call.htm (1993-1996).

"VocalTec Telephony Gateway" Next Generation Telephony http://archive.bibalex.org/web/19961225001822/vocaltec.com/products/gtw/gtwl.htm (Sep. 1996).

M. Rose (Dover Beach Consulting, Inc.), "Principles of Operation for the TPC.INT Subdomain: Radio Paging—Technical Procedures", http://www-usa.tpc.int/rfc/rfc1569.txt, printed Aug. 8, 2002, published 1994, pp. 1-6.

M. Rose (Dover Beach Consulting, Inc.), "Principles of Operation for the TPC.INT Subdomain: Radio Paging—Technical Procedures", http://www-usa.tpc.int/rfc/rfc1703.txt, printed Aug. 8, 2002, published 1994, pp. 1-9.

C. Allocchio (GARR-Italy), "Minimal Fax Address Format in Internet Mail", http://www.ietf.org/rfc/rfc2304.txt, printed Aug. 8, 2002, published 1998, Copyright—The Internet Society, pp. 1-8.

K. Toyoda, et al. (Cisco), "A Simple Mode of Facsimile Using Internet Mail", http://www.ietf.org/rfc/rfc2305.txt, printed Aug. 8, 2002, published 1998, Copyright—the Internet Society, pp. 1-13.

"Ourfax: World Wide Free Internet Email to Fax", http://www.ourfax.com/, printed Aug. 8, 2002, published 2000, pp. 1-3.

TPC.INT: Frequently Asked Questions, The Phone Company's Remote Printing Service's Frequently Asked Questions and Answers, http://www-usa.tpc.int/faq/tpcfaq.html, printed Aug. 8, 2002, printed and copyrighted by Mr. Arlington Hewes, pp. 1-9.

L. Mcintyre, et al. (Human Communications), "File Format for Internet Fax", http://www.ietf.orq/rfc/rfc2301.txt, printed Aug. 8, 2002, published 1998, pp. 1-72.

Emails from Monday Jul. 15, 1996 to Tuesday Aug. 20, 1996, Subject: Software faxing over Internet, email to G3 Fax (email to fax), pp. 1-10.

Content Feature Schema for Internet Fax, HalaFax Use and Copyright guide, copyright 1988-1995 (Sam Leffler), copyright 1991-1995 (Silicon Graphics, Inc), 11 pages.

"FACSys v4.7 Technical Specification Fax Hardware", http://www.spacetec.co.uk/products/FaxSys/facsys4.htm, published 2000, 2003 SpaceTec, 6 pages.

"Error! Unknown Switch Argument, j2 Global Holds Five U.S. Patents Covering Key Technologies in the Fields of Enhanced Communications, Messaging and Document Handling", 27 pages, published. Halyfax Use and Copyright, guide explaining this, 31 pages.

Radia Perlman, Interconnections: Bridges and Routers, Addison-Wesley, pp. v-vii, 1-17, 127-148, and 165-191 (1992).

Andrew Sears, Internet Telephony: Separating Facts From Hype, CTI TM, Jan./Feb. 1997, vol. 2, No. 1, pp. 76-79.

Marlan Company Begins Internet Voice Operations, Telecommunications Reports, Feb. 3, 1997, p. 14.

Gary Kim, Talk is Cheap, Voice over the Internet, America's Network, Jul. 15, 1996, pp. 34-36,38-39.

David Kopf, You Are Not Ready, Thinking of Providing Internet Services? Thinking of Centralizing Network Control? Think Again., America's Network, Jul. 15, 1997, pp. 48,59,60.

Message from Jeff Pulver, Saturday, Jun. 28, 1997, 12:12:49/0400(EDT), FWD II Network Update (printed from www.pulver.com/fwd/message.htm on Jul. 16, 1997.

Free World Dialup II Home Page, Voice on the Net® Fall '97, printed from http://www.pulver.com/fwd/ on Jul. 16, 1997.

NetPhone Brochure, Lan Server Integrated PBX, Claflin & Clayton, Inc. 203 Southwest Cutoff, Northboro, MA 01532.

Fax Say the Company—Internet Faxing, printed from http://www.faxsav.com/html/company.htm on Jul. 14, 1997 at 12:02 p.m.

Fax Say the Company—The FaxSay, Technology Edge, a White Paper printed from http://www.faxsay.com/html/whitepaper.htm Jul. 14, 1997 at 12:02 p.m.

Digiphone Brochure, Next Time You Get Your Long Distance Bill Blow It Off, Third Planet Publishing, Inc, 17770 Preston Road, Dallas, Texas 75252, A Subsidiary of Camelot Corporation.

The Company, NetCentric Corporation, 17 Msgr O'Brien Hwy, Cambridge, MA 02141, printed from http://www.netcentric.com/company/company.htm on Jul. 14, 1997 at 11:53 a.m.

SoftTek Inc., Corporate Fact Sheet, SoftTek Inc., 30555 Trabuco Canyon Road, Suite 100, Trabuco Canyon, CA 92678, printed from http://www.sftek.com/Pages/softkpg.htm , pp. 1-4, on Jul. 14, 1997 at 12:05 p.m.

Faxaway, Faxaway Frequently Asked Questions, Feb. 6, 1996, Faxaway, 417 Second Avenue West, Seattle, WA 98119, printed on Feb. 28, 1996 8:28 a.m.; pp. 1-7.

Ellis Booker, Most Businesses Aren't Ready to Do Conferencing on the Net, Web Week, Nov. 1995, pp. 40-41.

NetOffice, NetOffice—FaxWeb Fax Mailbox, printed Feb. 28, 1996 at 9:05 a.m, pp. 1-4.

FAXiNET(SM) World Wide Web Server, printed from http://www.awa.com/faxinet/faq.html on Feb. 13, 1996 at 10:35:34, pp. 1-3.

FAXiNET(SM) World Wide Web Server, printed from http://www.awa.com/faxinet/finrates.html on Feb. 13, 1996 at 10:35:34, pp. 1-3.

Message from FAXiNET(SM) World Wide Web Server, printed from http://www.awa.com/faxinet/subsforms.txt on Feb. 13, 1996 at 10:35:34, pp. 1-3.

Lenny Liebmann, Talk, Talk, Talk-Internet telephony promises to make speech truly free, or does it?, Netware Solutions, Jan. 1997, pp. 2, 28-30.

Advertisement via facsimile dated Mar. 12, 1997 11:05 a.m., CyNet, Inc., 12777 Jones Road, Suite 400, Houston, TX 77070.

Richard "Zippy" Grigonis, Computer telephony Over the Internet, CT and the Net, Computer Telephony, Mar. 1996, pp. 166-221.

Harry Newton and Sean Rubacky, The Fastest "Phone" System You'll Ever Own, Computer Telephony, A Supplement to Teleconnect, Mar. 1996, pp. 3-8.

Bonny Georgia and Daniel Levine, Web Free for All, PC Computing, Feb. 1997, pp. 118-122, 124,127-128,130,133-134,144,147-148,152, 155-156, 158.

Richard "Zippy" Grigonis, Audio, Video and Data Conferencing Over the Internet, Computer Telephony, Mar. 1997, pp. 192-238.

Brochure Corporate Fax Exhange, NetXchange, NetXchange Communications Ltd., POB 184 Migdal Ha-Emek, 10551, Israel (1996).

Computer Technology Conference Exposition 96, Second Addendum, Seminar Manual, Computer Technology, Teleconnect, Call Center & Imaging Magazines, 12 West 21 Street, New York, NY 10010, Mar. 12-14, 1996, Los Angeles Convention Center.

Internet V. Telephone, IEEE Spectrum, Jan. 1996, p. 36.

Brochure, Probe Research, "Voice Over the Internet, The Next Telecom Battleground", Three Wing Drive, Suite 240, Cedar Knolls, New Jersey, USA 07927-1000.

Brochure, Probe Research Market Studies and Custom Research Services, New Mega Strategies Study from Schnee and Tomotillo . . . , Probe Research, Three Wind Drive, Suite 240, Cedar Knolls, NJ, pp. 1-7.

Brochure, The Second Complete Analysis . . . Confronting Cable Operators Entering Telephony Network Services . . . , Probe Research, pp. 1-2.

Brochure Telephone Book IV, The Official Data Report of the U.S. Telecom Industry, Probe Research, Inc., Three Wing Drive, Suite 240, Cedar Knolls, NJ, 07927-1000.

Dave Krupinski, Computer Telephony and the Internet, printed from http://www.flatironpublishinq.com/ctwhite/ctinetwp.html on May 28, 1996 08:07:08 pp. 1-2.

Brochure, Roads The Advent of Client/Server Telephony Networks, with attached Table of Contents, Probe Research, Inc. Three Wing Drive, Suite 240, Cedar Knolls, NJ, 07927-1000.

Brochure, The mmds Platform—The Wireless Cable Option for Telcos, Probe Research, Inc. Three Wing Drive, Suite 240, Cedar Knolls, NJ, 07927-1000.

(56) References Cited

OTHER PUBLICATIONS

Brochure, Superhighway Scenarios—An Analysis of Full Competition in the Local Loop, Probe Research, Inc. Three Wing Drive, Suite 240, Cedar Knolls, NJ, 07927-1000.
Brochure, Broadband Networks-Subscription Service, Probe Research, Inc. Three Wing Drive, Suite 240, Cedar Knolls, NJ, 07927-1000.
Brochure, PCS Transport Market Opportunities, Probe Research, Inc. Three Wing Drive, Suite 240, Cedar Knolls, NJ, 07927-1000.
M. Borden et al.; "RFC 1821—Integration of Realtime Services in an IP-ATM Network Architecture;" IETF Network Working Group, Aug. 1995, pp. 1-20.
Stephen Casner et al.; "1982 Annual Technical Report, Wideband Communication;" Report No. ISI/SR-63-23, University of Southern California, Information Sciences Institute, Jun. 1982, pp. 77-89.
Stephen Casner et al.; "1984 Annual Technical Report, Wideband Communication;" Report No. ISI/SR-85150, University of Southern California, Information Sciences Institute, Jun. 1982, pp. 74-85.
Vinton G. Cerf et al.; "A Protocol for Packet Network Intercommunication;" IEEE Transactions on Communications, No. 8, May 1974, pp. 637-648.
Thomas M. Chen et al.; "Integrated Voice/Data Switching;" IEEE Communications Magazine, vol. 26, No. 6, Jun. 1988, pp. 16-26.
Danny Cohen et al.; "A Network Voice Protocol NVP-II;" University of Southern California, Information Sciences Institute, and Massachusetts Institute of Technology, Lincoln Laboratory, Apr. 1, 1981, pp. 1-71.
Randolph E. Cole et al.; "1979 Annual Technical Report, Network Secure Communication;" Report No. ISI/SR-8017, University of Southern California, Information Sciences Institute, Sep. 1979, pp. 53-70.
Randy Cole; "Dialing in the WB Network;" University of Southern California, Information Sciences Institute, Apr. 30, 1981, pp. 1-19.
Douglas E. Corner; "Internetworking with TCP/IP, vol. 1, Principles, Protocols, and Architecture, Third Edition;" Department of Computer Sciences, Purdue University, 1995, pp. 303-323.
L.T. Corley; "Bellsouth Trial of Wideband Packet Technology;" IEEE International Conference on Communications 1990, Atlanta, GA, Apr. 16, 1990, pp. 100-102.
John D. DeTreville et al.; "A Distributed Experimental Communications System;" Advances in Local Area Networks, IEEE Press, 1987, pp. 533-542.
Gross, Phillip et al.; "Proceedings of the Oct. 15-17, 1986 Joint Meeting of the Internet Engineering and Internet Architecture Task Forces;" Fourth IETF, The Mitre Corp., 272 pages.
Mark J. Handley et al.; "Multimedia Integrated Conferencing for European Researchers (MICE): Piloting Activities and the Conference Management and Multiplexing Centre;" Computer Networks and ISDN Systems, vol. 26, 1993, pp. 275-290.
Harold M. Heggestad; "Voice and Data Communication Experiments on a Wideband Satellite/Terrestrial Internetwork System;" Conference Record vol. 1 of 3, IEEE International Conference on Communications: Integrating Communication for World Progress, Boston, MA, Jun. 19-22, 1983, pp. 1-8.
Yuji Inoue et al.; "Evolution Scenario of Broadband Services Based on Granulated Broadband Network Concept;" IEEE Region 10 Conference, Nov. 11-13, 1992, Melbourne, Australia, pp. 297-301.
Yuji Inoue et al.; "Granulated Broadband Network Applicable to B-ISDN and PSTN Services;" IEEE Journal on Selected Areas in Communications, vol. 10, No. 9, Dec. 1992, pp. 1474-1488.
International Telecommunications Union—Telecommunication Standards Section (ITU-T); "H.323 Draft Standard;" Sep. 22, 1995, pp. 1-30.
P. T. Kirstein et al.; "Piloting of Multimedia Integrated Communications for European Researchers (MICE);" Proc. of INET '93, International Networking Conference in San Francisco, CA, Aug. 1993, pp. DCA-1 to DCA-12.
Graham Knight et al.; "A Data and Telecommunications Gateway between the Internet and ISDN;" Proc. of INET '95, International Networking Conference in Honolulu, Hawaii, pp. 947-956, Jun. 1995.
Ian Merritt; "Providing Telephone Line Access to a Packet Voice Network;" Report No. ISI/RR-83-I07, University of Southern California, Information Sciences Institute, Feb. 1983, pp. 1-15.
Sanjiv P. Patel et al.; "The Multimedia FaxMIME Gateway;" IEEE Multimedia, vol. 1, No. 4, pp. 64-70, Dec. 1994.
Eve M. Schooler et al.; "A Packet-switched Multimedia Conferencing System;" ACM SIGOIS Bulletin, vol. 1, No. 1, pp. 12-22, Jan. 1989.
H. Schulzrinne; "Issues in Designing a Transport Protocol for Audio and Video Conferences and other Multiparticipant Real-Time Applications;" Internet Engineering Task Force (IETF), Audio-Video Transport Working Group, Internet Draft, Oct. 20, 1993, pp. 1-65.
Henning Schulzrinne; "Voice Communication Across the Internet: A Network Voice Terminal;" Technical Report TR 92-50, Dept. of Computer Science, University of Massachusetts, Amherst, MA, Jul. 29, 1992, pp. 1-34.
Andrew Sears; "The effect of Internet Telephony on the long distance voice market;" Working Paper, Jan. 14, 1995, pp. 1-24.
John F. Shoch; "Carrying voice traffic through an Ethernet local network—a general overview;" Xerox Palo Alto Research Center (PARC), Palo Alto, CA, Aug. 1980, pp. 1-16.
D. C. Swinehart et al.; "Adding Voice to an Office Computer Network;" Xerox Palo Alto Research Center (PARC), Report No. CSL-83-8, Feb. 1984, pp. 1-16.
Harrick M. Vin et al.; "Multimedia Conferencing in the Etherphone Environment;" Computer, vol. 24: 10, Oct. 1991, pp. 69-79.
Clifford J. Weinstein et al.; "Experience with Speech Communications in Packet Networks;" IEEE Journal on Selected Areas in Communications, vol. SAC-I, No. 6, Dec. 1983, pp. 963-980.
Clifford J. Weinstein et al.; "Packet Speech Systems Technology;" Massachusetts Institute of Technology Lincoln Laboratory, Semiannual Technical Summary Report to the Defense Advanced Research Projects Agency, Lexington, MA, Aug. 18, 1982, pp. 1-31.
Clifford J. Weinstein; "Defense Switched Network Technology and Experiments Program, Annual Report;" Report No. ESD-TR-86/0061, Massachusetts Institute of Technology, Lincoln Laboratory, Sep. 30, 1985, pp. 1-63.
Clifford J. Weinstein; "The Experimental Integrated Switched Network—a System Level Network Test Facility;" IEEE MILCOM '83 Con! Rec., Nov. 1983, pp. 449-456.
Clifford J. Weinstein; "Network Speech Systems Technology Program, Annual Report to the Defense Communications Agency;" Report No. ESD-TR-86-006, Massachusetts Institute of Technology, Lincoln Laboratory, Feb. 4, 1982, pp. 1-3, 39-72.
Clifford J. Weinstein; "Defense Switched Network Technology and Experiments Program, Annual Report;" Report No. ESD-TR-86/0061, Massachusetts Institute of Technology, Lincoln Laboratory, Feb. 29, 1984, pp. 1, 2, 15-30.
Clifford J. Weinstein et al.; "Wideband Integrated Voice/Data Technology, Semiannual Technical Summary Report;" Massachusetts Institute of Technology, Lincoln Laboratory, Jul. 18, 1983, pp. 1-28.
Polle T. Zellweger et al.; "An Overview of the Etherphone System and its Applications;" Proceedings of the 2nd IEEE Conference on Computer Workstations, Mar. 7-10, 1988, pp. 160-168.
Polle T. Zellweger; "Active Paths Through Multimedia Documents;" Xerox Palo Alto Research Center (PARC), Palo Alto, CA, May 1989, pp. 1-16.
"Vocaltec Introduces the Internet Phone Telephony Gateway Linking Traditional and Internet Telephone Networks;" PR Newswire, Mar. 8, 1996, pp. 1-3.
Douglas B. Terry et al.; "Managing Stored Voice in the Etherphone System;" reprinted by Xerox Palo Alto Research Center (PARC), Palo Alto, CA, copyright 1988 Association for Computing Machinery, pp. 1-26.
Daniel C. Swinehart; "System Support Requirements for Multi-media Workstations;" reprinted by Xerox Palo Alto Research Center (PARC), Palo Alto, CA, copyright 1988 Speech Tech, pp. 1-3.

(56) References Cited

OTHER PUBLICATIONS

Schulzrinne et al.; "RTP: A Transport Protocol for Real-Time Applications;" Audio-Video Transport Working Group, Internet Engineering Task Force, Internet Draft, Mar. 21, 1995, pp. 1-62.

RFC: 793, "Transmission Control Protocol;" DARPA Internet Program Protocol Specification, prepared by Information Sciences Institute, University of California, Sep. 1981, pp. 1-84.

RFC: 791, "Internet Protocol;" DARPA Internet Program Protocol Specification, prepared by Information Sciences Institute, University of California, Sep. 1981, pp. 1-45.

"Packet Speech Systems Technology;" Massachusetts Institute of Technology Lincoln Laboratory, Semiannual Technical Summary Report to the Defense Advanced Research Projects Agency, Jul. 10, 1981, pp. 1-18.

James W. Forgie; "IEN 119, ST—A Proposed Internet Stream Protocol;" MIT Lincoln Laboratory, Sep. 7, 1979, pp. 1-37.

Daniel C. Swinehart; "Telephone Management in the Etherphone System;" Xerox Palo Alto Research Center (PARC), Palo Alto, CA, May 1989, pp. 1-5.

International Telecommunications Union—Telecommunication Standards Section (ITU-T); "H.323 Draft Standard;" May 28, 1996, pp. 1-75.

Reexamination No. 95/002,190, Response to Office Action Dated Mar. 26, 2013.

Lindgren, Bo et al.; "Illustrated ISDN—a painless primer to principles and protocols"; pp. 1-6 to 1-9; INFOTRANS, 1991.

\* cited by examiner

SYSTEM FOR INTERCONNECTING STANDARD TELEPHONY COMMUNICATIONS EQUIPMENT TO INTERNET

RELATED APPLICATION DATA

This application is a continuation of, and claims priority to U.S. application Ser. No. 13/027,232 filed Feb. 14, 2011, which is a continuation of, and claims priority to U.S. application Ser. No. 11/253,129 filed Oct. 18, 2005 (issued as U.S. Pat. No. 7,889,722), which is a continuation of, and claims priority to U.S. application Ser. No. 10/770,808 filed Feb. 3, 2004 (issued as U.S. Pat. No. 6,985,494), which is a continuation of, and claims priority to U.S. application Ser. No. 10/279,645 filed Oct. 24, 2002, which is a continuation of, and claims priority to U.S. application Ser. No. 08/812,745 filed Mar. 6, 1997, application Ser. No. 08/812,745 is related to, and claims priority under 35 U.S.C. §119 with respect to, Provisional Application No. 60/012,896 filed Mar. 6, 1996 and Provisional Application No. 60/013,240 filed Mar. 11, 1996. The contents of application Ser. Nos. 13/027,232, 11/253,129, 10/770,808, 10/279,645, 08/812,745, 60/012,896 and 60/013,240 are hereby expressly incorporated by reference herein in their entireties.

RESERVATION OF COPYRIGHT

The disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyrights whatsoever.

FIELD OF DISCLOSURE

The present disclosure relates to a system for linking standard telephony communications using internet protocols.

DESCRIPTION OF BACKGROUND INFORMATION

Telephony communications systems connect various types of telephone communications equipment, including, e.g., digital and analog telephones, facsimile (sending and/or receiving) machines, and data and/or facsimile modems.

Such telephony communications systems may comprise a network of varying systems interconnected with various types of transmission links. Such interconnected systems may include, e.g., centrex systems, private branch exchange (PBX) systems, and key telephone systems.

Transmission links provide links across various physical distances, serving as, e.g., long-distance lines, local exchange carrier lines, foreign exchange lines, 800 WATS lines, and/or tie-lines. The physical connection may be made with the use of a cable, e.g., a twisted copper pair, fiber-optic cabling, two-wire open lines, coaxial cable, or it may be wireless, e.g., using cellular technologies, satellite transmission systems, terrestrial microwave links, radio links. One or more combinations of existing or future transmission technologies may be used, such as T1, CEPT PCM-30, SONET, ISDN, frame relay, and asynchronous transfer mode.

Telephony communications systems utilize switching networks to connect one telephony device (telephone, fax, modem, etc.) to another, in accordance with a telephone number (the telephony destination address) specified by one of the telephony devices to be connected. A telephone number over a public switch telephone network (PSTN) will typically comprise a three-digit area code (number plan area (NPA)), followed by a three-digit exchange code (sometimes referred to as NNX or NXX), and then a four digit code used to identify the specific telephone line of the destination telephony device.

An example of a telephony communications system is a public switched telephone network (PSTN). Access to the PSTN is provided using the telephony communications equipment, as well as other equipment such as hardwiring which is extended between the telephony communications equipment and a system with which it is interfaced. For instance, hardwiring may extend from the telephony communications equipment to a wall outlet, from the wall outlet to the building exterior, and from the building exterior to the telephony communications system. Alternatively, telephony communications equipment may access the telephony communications systems using a transmitter (e.g., cellular) or through other known means. In either case, a considerable amount of hardware is presently in place to provide communication between the telephony communications system (e.g., PSTN) and telephony communications equipment (e.g., telephone).

Conventionally, communications over telephony communications systems are performed based on a connection-oriented network model. In the connection-oriented network model, a pathway is formed between a source node and a destination node of the telephony communications system before communication begins, creating what is commonly referred to as a virtual circuit therebetween. The pathway is commonly established using a handshaking procedure in which the source node requests communication by informing the network of the destination node, the network then notifies the destination node of the request, whereupon the destination node accepts or refuses a request for communication. If the destination node accepts the request for communication, the source node, the destination node and all resources of the telephony communications system that are used to define the pathway therebetween are reserved for the communication.

Conventional PSTN-type telephony communications systems connect telephones as follows. The caller (source) requests a communication by dialing (informing) the PSTN of a telephone number (destination). After the telephone number has been dialed, the PSTN establishes a path, reserves whatever resources are necessary to maintain that path, contacts the destination by ringing its phone, and conducts the communication after the request is accepted. As such, the resources of the PSTN remain reserved from the time of inception of a communication to its completion.

Under the present regulatory scheme, communications over telephony communications systems are classified among three categories: intraLATA ("Local Access Transport Area"), interLATA and international. IntraLATA communication is performed when the source and destination nodes are both located in a single calling area; interLATA communication is performed when the source and destination nodes are located in different calling areas within a single country, and international communication is performed when the source and destination nodes are located in calling areas of different countries. Typically, the three categories rank as listed above in order of expense with intraLATA communications generally being provided at the lowest cost.

In view of the above, there is a need for a system that is capable of maximizing the communications of presently available resources, including resources not presently used by conventional telephony systems. There is also a need for a system that is capable of reducing costs associated with conventional telephony communications systems.

It is costly to reconfigure a given traditional telephony communications system, such as a centrex system, a PBX system, or a key telephone system. As just one example, the creation and testing of a new telephone circuit will be quite labor-intensive, requiring such actions as locating the switch, finding a suitable and available wiring connection to establish the telephone circuit, making many cross-connections between and/or splicing of cables to route the wiring to the desired end destination, and performing different testing and verification procedures to ensure that a proper connection is made. If at any critical point in the path of a circuit, the available lines reach their full capacity, new lines will need to be installed to accommodate new telephony circuits, or the circuit must be diverted in a less than optimal manner to utilize existing cable facilities.

Much effort has been spent recently to integrate computer technologies having much more flexibility with hard-wired/switched telephony systems, to thus combine the strengths of each of these areas. Computer telephony integration (CTI) standards have been developed for communications between computer and telephony platforms, including, e.g., computer supported telephony applications (CSTA) and switch-computer applications interface (SCAI), Versit, and the INTEL-proposed high-speed serial interface.

There is a need to further reduce limitations and configuration costs associated with hard-wired/switched telephony systems. There is also a need for systems facilitating the efficient utilization of computer systems and networks for telephony applications, for local intra-office, local extra-office, long distance and/or international voice, fax, and data communications.

DEFINITION OF TERMS

The following term definitions are provided to assist in conveying an understanding of the various exemplary embodiments and features disclosed herein.

Connectionless-Style Network Layer Protocol:

A connectionless-style network layer protocol is defined in Chapters 5 and 7 of Radia Perlman's book entitled "Interconnections: Bridges and Routers," Addison-Wesley (1992), pages 127-148 and 165-191. The content of the Chapters 5 and 7 of this book is hereby expressly incorporated by reference herein in its entirety. Examples of connectionless-style network layer protocols include, e.g., the CLNP and IP protocols.

Internet:

An internetwork comprising large computer networks interconnected over high-speed data links such as ISDN, T1, T2, FDDI, SONET, SMDS, OT1, etc. As described in Newton's Telecom Dictionary, the Internet accommodates a new computer that connects to the Internet by adopting the new connection as part of the Internet and beginning to route Internet traffic over the new connection and through the new computer. The Internet uses a connectionless-style network layer protocol.

Telephony Communications Equipment:

A device compatible with a telephony communications system. An example of such a device is one that initiates a connection by specifying, among other things, a telephony destination address, and completes a call connection when its telephony destination address has been specified by another device. Examples of telephony communications equipment include analog and digital telephones, cellular telephones, facsimile machines, and dial-out data and/or facsimile modems.

SUMMARY

The present disclosure is provided to improve upon conventional communications systems by maximizing the efficiency usage of communications resources, thereby reducing costs, e.g., related to infrastructure, enhancements and usage. In order to achieve this end, one or more aspects of the present invention may be followed in order to bring about one or more specific objects or advantages, such as those noted below.

One object of the present invention is to better facilitate communications over the Internet, using standard telephony communications equipment.

Another object of the present invention is to efficiently use existing telephony resources to communicate by taking advantage of hardware presently in place within the existing telephony communications infrastructure, as well as to provide more versatile new communications technologies.

A further object of the present invention is to provide a system for best managing communication costs by, for instance, identifying and/or utilizing alternative lower cost communication pathways between a source and a destination.

To achieve these and other objects, the present invention may be directed to a method or system, or one or more parts thereof, for managing communications between a source and a destination to allow payload data to be passed over the Internet using conventional telephony communications equipment such as a telephone and conventional telephony communications systems such as the public switch telephone network (PSTN). A network of Internet servers may be connected to the Internet and to telephony communication systems. As such, telephony communication equipment can access the Internet through Internet servers of the network. Payload data sent by telephony communication equipment to a local Internet server is sent via the Internet to a different Internet server of the network located proximate to the destination specified in the communication.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein.

DETAILED DESCRIPTION OF AN EXEMPLARY EMBODIMENT

This disclosure allows individuals, with unmodified, standard fax equipment to fax to anyone else with unmodified, standard fax equipment regardless of distance. The fax is sent without the aid of a long distance telephone communication connection by creating a temporary, individualized network connection where "network" is taken broadly to mean the entire system required to complete a communication from an originator to a target. This network will use the Internet via two dependent Internet Fax Servers (IFS) local to both the originator and target.

The system contains several components which actually transmit the fax message and related information, provide eMail notification reports of the status for faxes within the system, provide an accounting of services rendered for both the customer and the telephone company, allow individuals with internet access to "prefer" to receive faxes via eMail from originators using the invention, and control and supervise all of these activities.

In this system, it is presumed that the IFS's are placed at either end of the Internet local to both the Originator and Target equipment as indicated in FIGS. 7, 8, 9, 10 and 11. In this setting, the IFS system can be controlled and its services offered by either end. Each IFS can be an Originator or a Target device. It would be best if these IFS's are positioned within the local calling circle for each party, but it may be positioned to require a long distance call to either party. The choice for site placement may be driven by any number of economic, market, or legal considerations, which would militate toward offering the system at an alternate location.

To more clearly understand the present invention, it is useful to consider the manner in which a fax transmission occurs in the traditional setting. The communication between machines exclusive to their local calling circle must access long distance communications in order to connect. Once the connection is made, there is an exchange of digital data that identifies the sending and receiving machines to each other and establishes the fax mode or format to be used. If this exchange is satisfactory, then the actual image transmission takes place. Otherwise, the call is terminated, usually with some form of written diagnostic report to the respective user.

Receiving a Fax at an IFS

Figure 11:
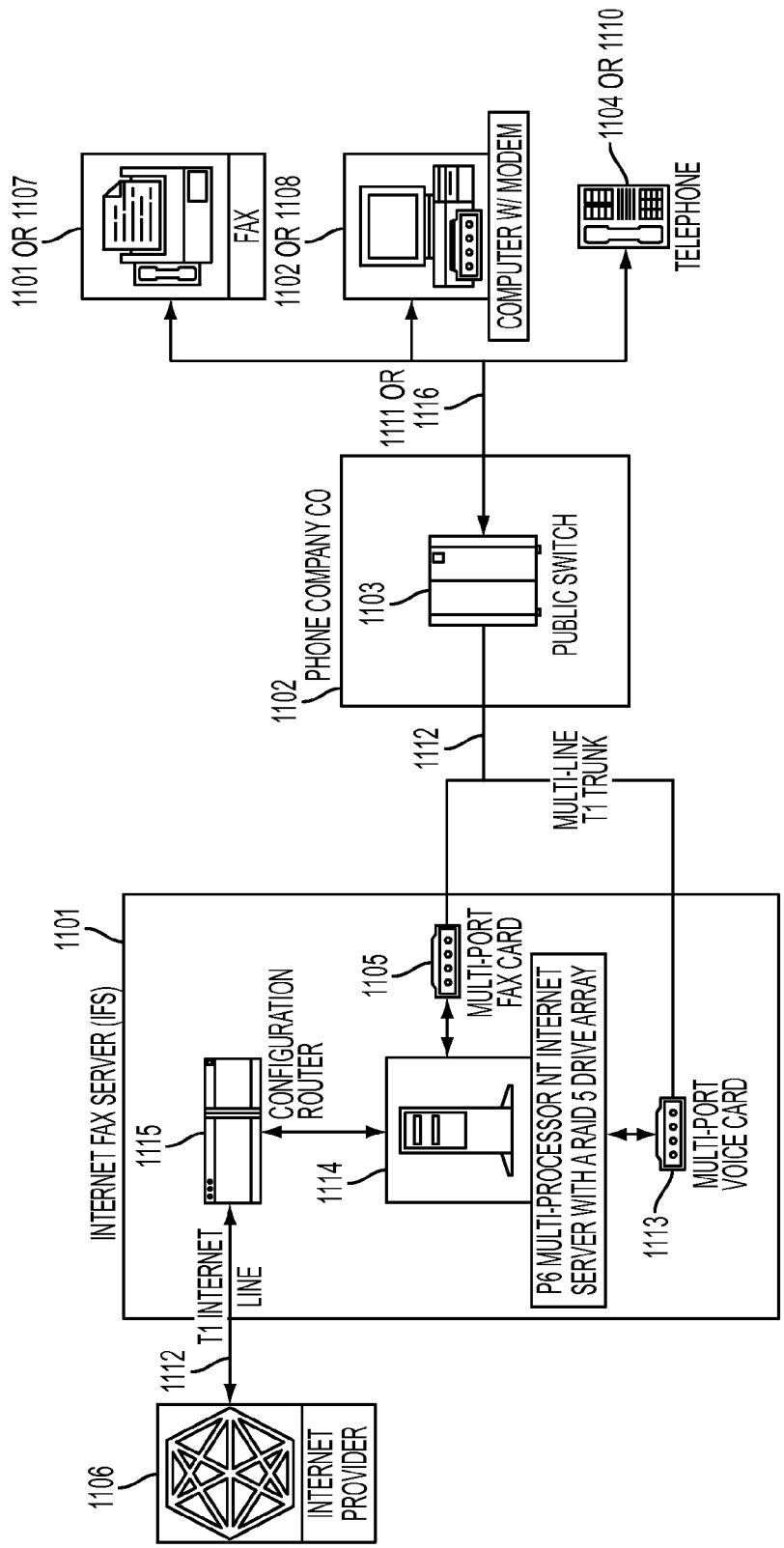
FIG. 11 illustrates a break down of necessary equipment for an Internet Fax Server, such as shown in FIG. 7.

FIG. 11 shows, in the present invention, all fax or eMail transmissions initiated by a subscriber to the Internet Fax Service are first intercepted at an IFS by one of two means, either (1) via a standard analog signal coming through a Multi-port fax card 1105 connected by a T1 internet line 1112 to a public switch 1103 at a local provider level 1102 using standard phone lines 1111 or 1116 originating from a standard fax machine 1101 or 1107 or a computer with a modem 1102 or 1108, or (2) via a digital signal through a Fixed-Configuration Router 1115 connected by T1 internet line 1112 to an Internet provider 1106.

Figure 12:
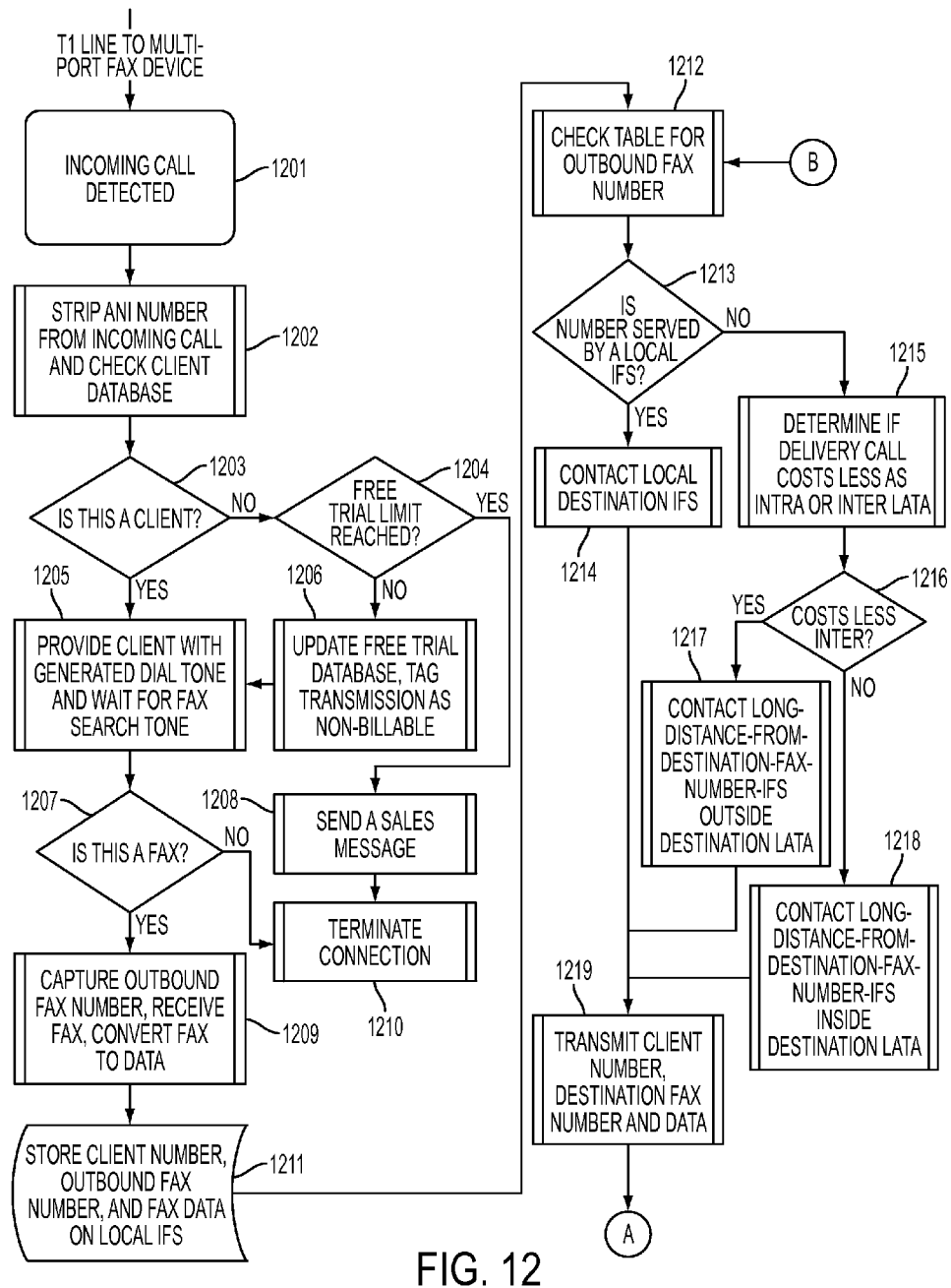
FIG. 12 shows a flow chart describing the general processing steps required for an Internet Fax Server to receive a fax over a Multi-port Fax Device, such as shown in FIG. 11.

Access to the IFS in FIG. 11 can be obtained much the same way as access to a specific long-distance company's network. That is, subscribers such as 1101, 1102, 1107, or 1108 can dial a local IFS, wait for another dial tone, and then have their equipment as 901 or 902 in FIG. 9 dial a unique destination fax number and send the fax. The IFS then receives the fax in place of the destination machine in step 942 of FIG. 9. The data will be stored in step 943 in FIG. 9, not to facilitate a "store and forward" technique, but merely as a precaution before locating a target IFS preferably local to the destination fax number in step 944 in FIG. 9. The data is then prepared to be sent via the Internet 906 in FIG. 9 to its target IFS. The outline for the software development to facilitate this process can be found in FIG. 12.

Figure 9:
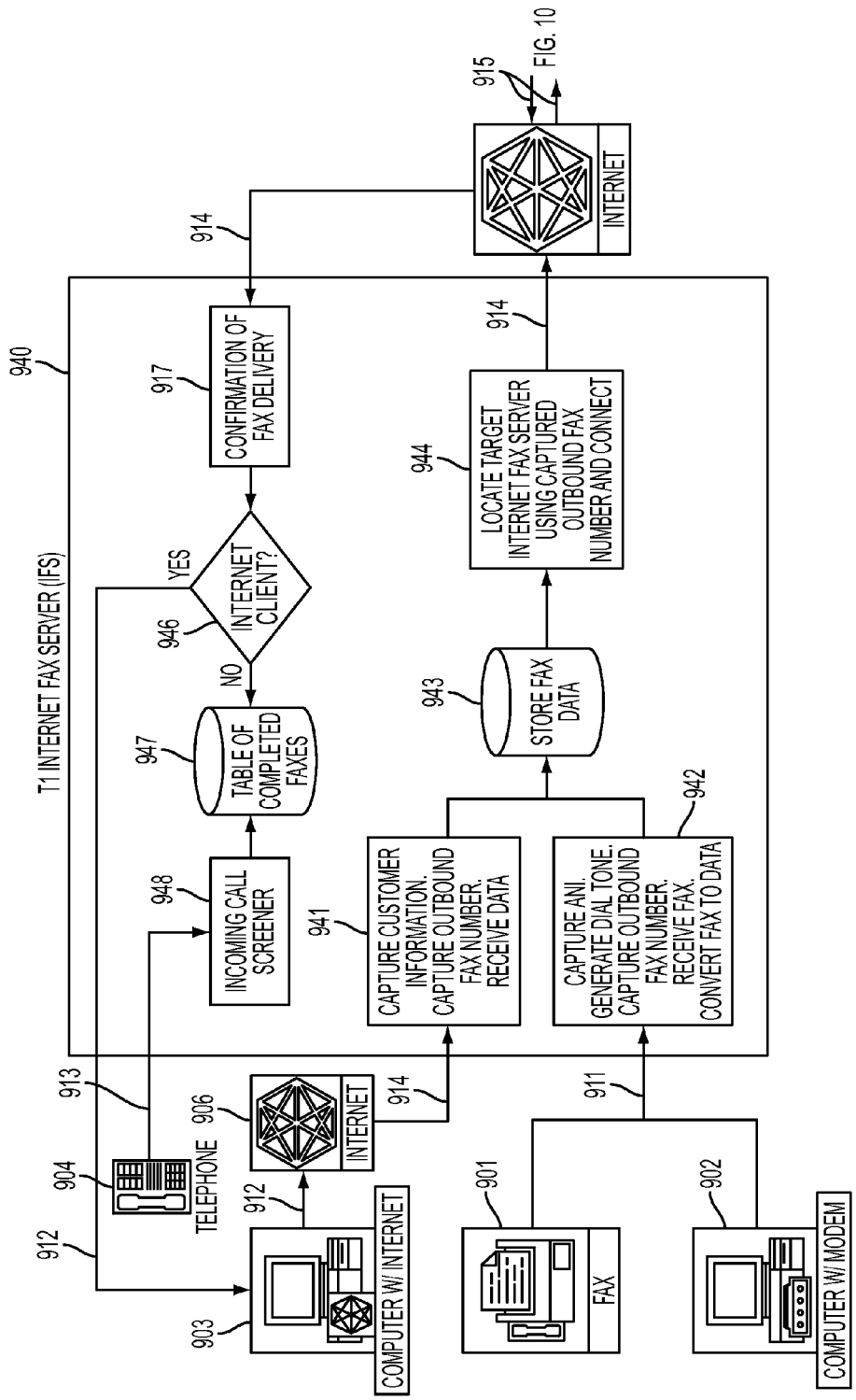
FIG. 9 shows a more detailed view of the various receiving functions within an Internet Fax Server, such as shown in FIG. 7.

A device 903 on the internet in FIG. 9 could access the IFS in much the same way as it sends eMail to any other device. The address of the eMail preceding the "@" symbol the standard internet IP address of the IFS would contain the destination proper name and fax number separated by periods ".". The IFS then receives the eMail data and converts it into fax format in place of the destination machine in step 941 of FIG. 9. The data will be stored in step 943 in FIG. 9, not to facilitate a "store and forward" technique, but merely as a precaution before locating a target IFS preferably local to the destination fax number in step 944 in FIG. 9. The data is then prepared to be sent via the Internet 906 in FIG. 9 to its target IFS. The outline for the software development to facilitate this process can be found in FIG. 13.

Transmitting a Fax to a Target IFS

Figure 10:
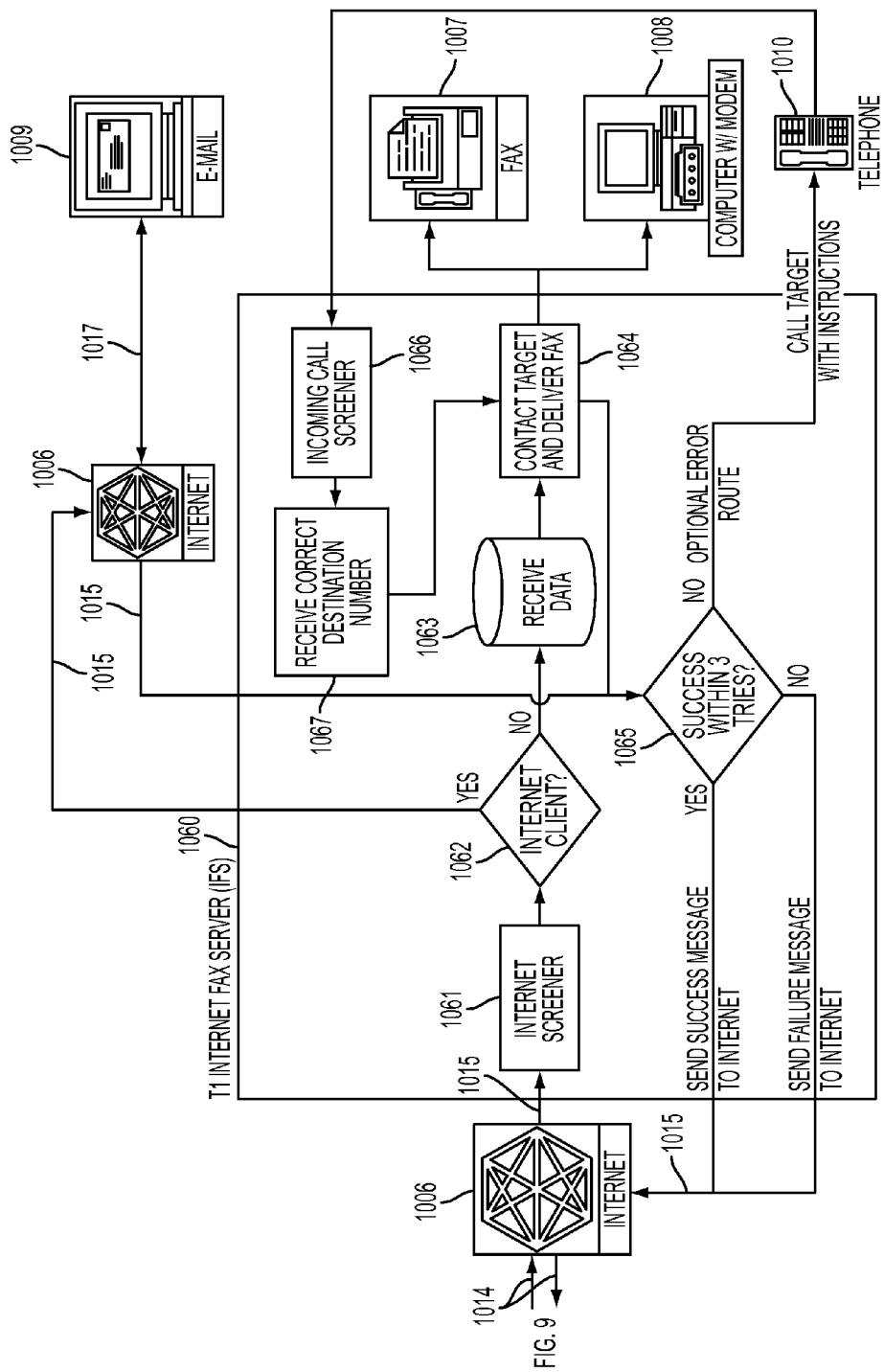
FIG. 10 shows a more detailed view of the various delivery functions within an Internet Fax Server, such as shown in FIG. 7.

Once a receiving IFS 1060 in FIG. 10 receives the data, it must locate the target IFS. There are only two questions that must be resolved before the data may be transmitted? 1) Is the target fax number served by an IFS that can dial it as a local phone call?; and 2) If the answer to the first question is "no", then is it cheaper to send the fax within the target fax numbers LATA or to send it from outside the LATA? A LATA (Local Access Transport Area) is the area served by local telephone dialing circles. In some cases, it is long distance to call someone within a LATA but outside the dialing circle. Once the cheapest route is established, an IFS is located to deliver the fax. This process is detailed in FIG. 12. Transmission occurs when the target IFS is contacted as in 1015 of FIG. 10 and accepts the transmission. This acceptance occurs during a screening of the incoming Internet signal by a target IFS in step 1061 in FIG. 10. It is then established if this is a calling IFS 940 in FIG. 9 or an Internet Client 1009 in FIG. 10. Data is then received from the transmission point into a safety backup in step 1063 in FIG. 10, used in the event that the final transmission is a failure in step 1065 of FIG. 10. The details of this process are found in FIG. 13.

Delivering a Fax

Figure 4:
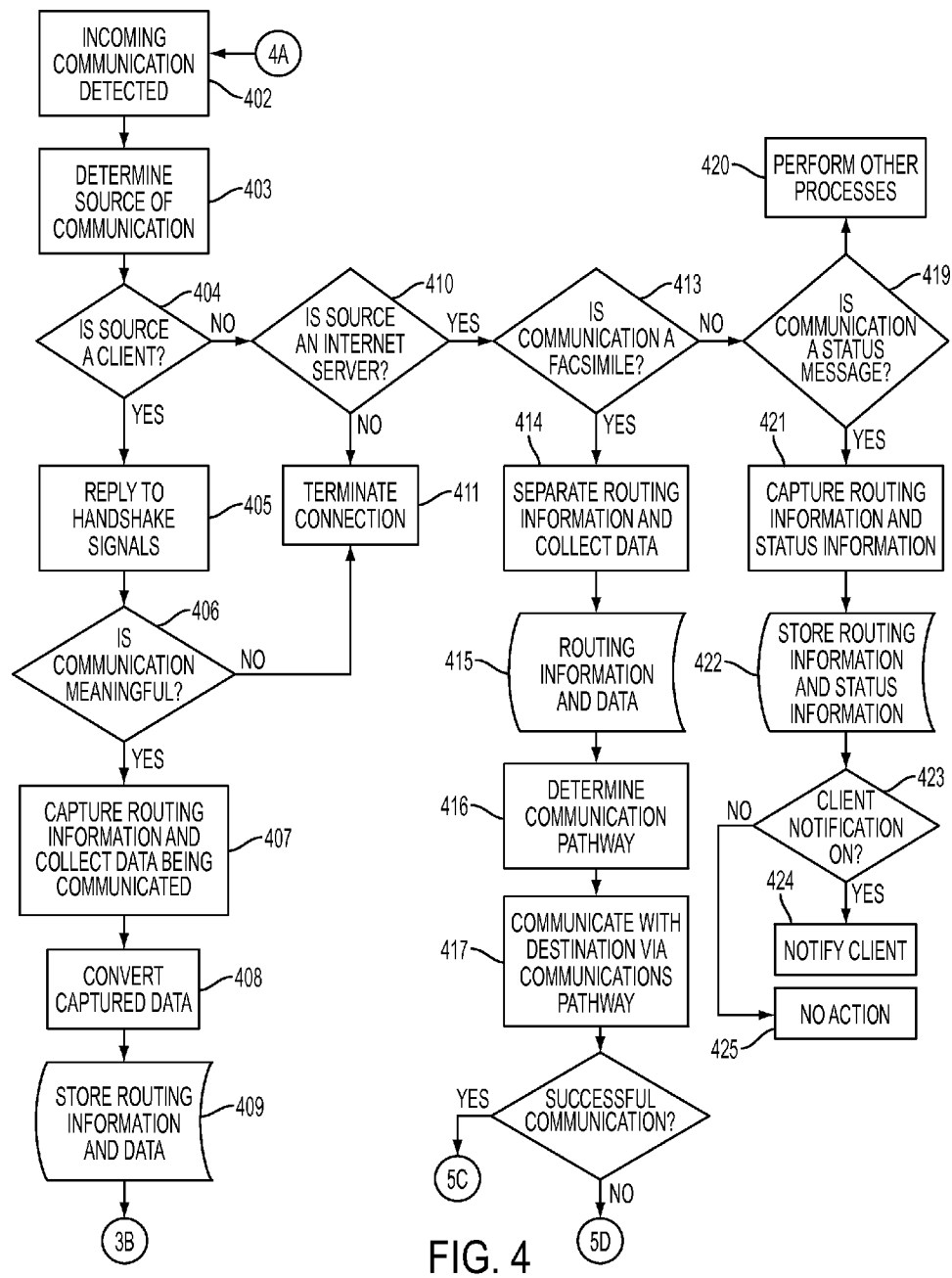
FIGS. 4 and 5 illustrate example processes implemented by an Internet server that receives a communication.

Once the data 1063 in FIG. 4 is stored on the target IFS 1060 in FIG. 10, contact is attempted using the destination fax number sent from the originator by dialing the destination fax device 1007 or 1008 in FIG. 10. At this point, normal fax standards are followed for communication. If the attempt is successful or unsuccessful, the status is updated as in 1065 of FIG. 10. This process is detailed in FIGS. 13 and 14.

Optional Error Route

Figure 14:
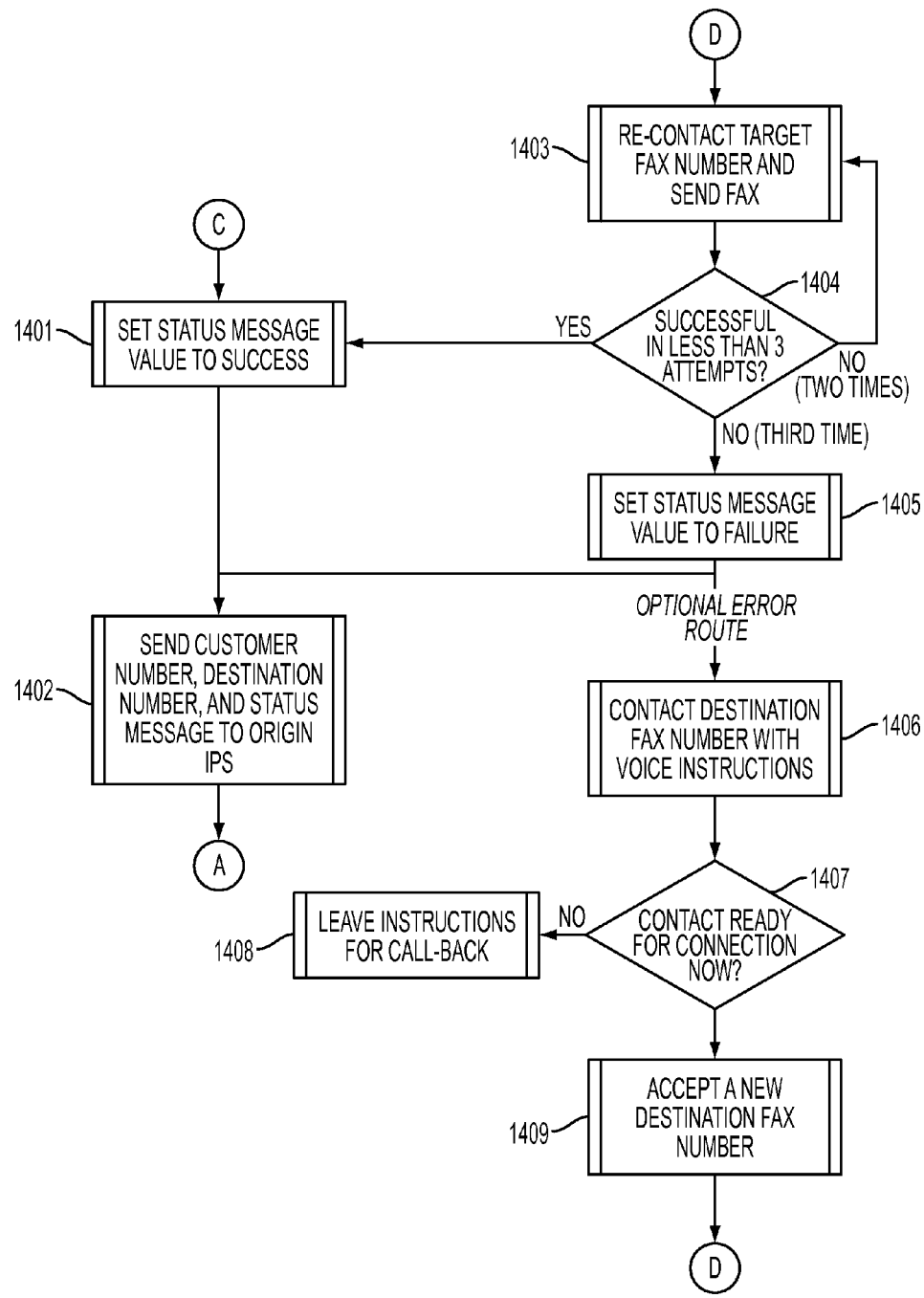
FIG. 14 shows a flow chart describing the general processing steps required for an Internet Fax Server to re-deliver a failed fax or data target equipment, such as shown in FIG. 7, and to send a status to the Origin Internet Fax Server.
Figure 15:
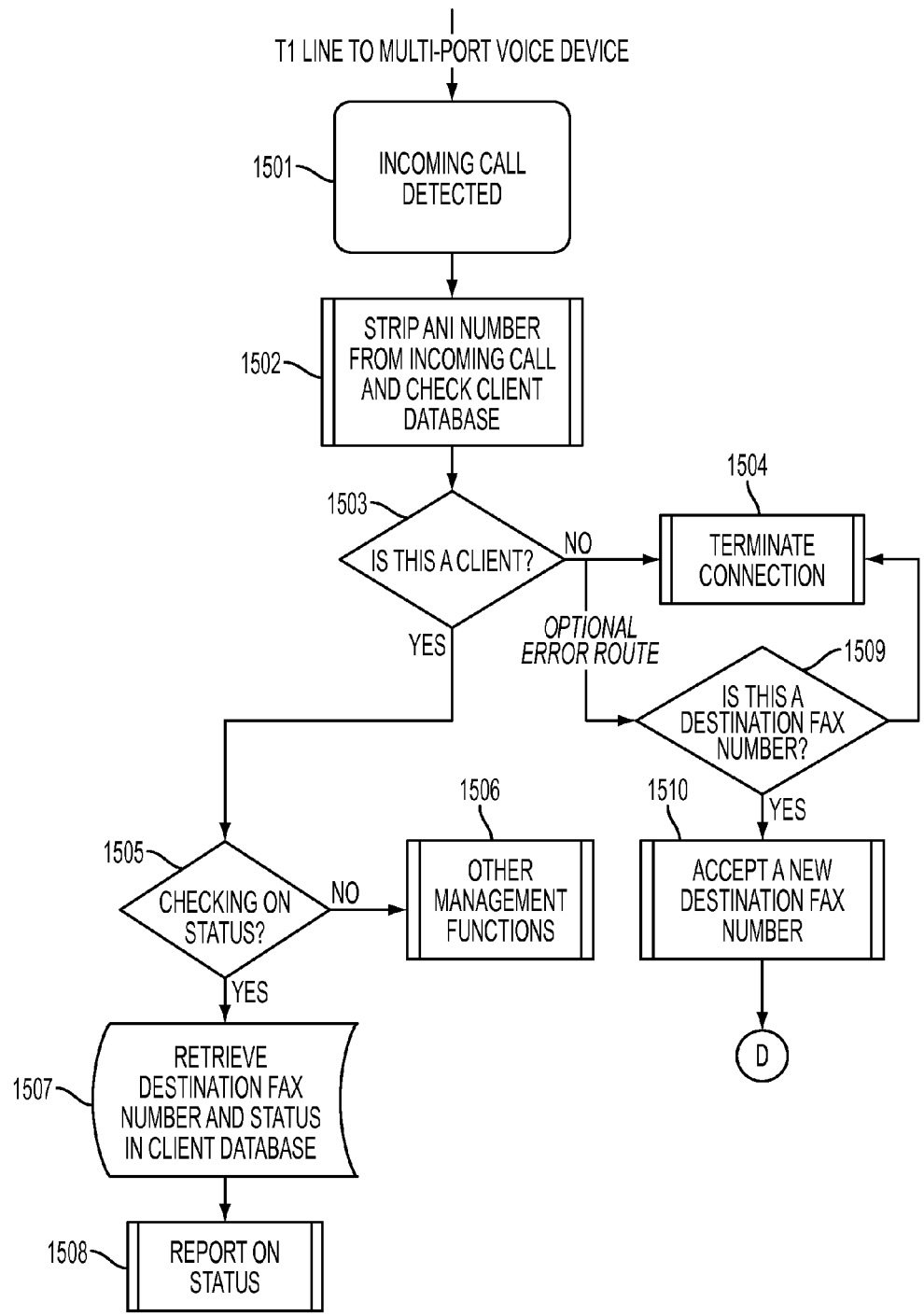
FIG. 15 shows a flow chart describing the general processing steps required for an Internet Fax Server to receive an incoming voice transmission using a Multi-port Voice Card, such as shown in FIG. 11, and report on a status of a fax or handle the Optional Error Route.

In the event the fax transmission in step 1064 in FIG. 10 is unsuccessful, an Optional Error Route may be employed. This process would contact the destination fax number in the event that it was really a voice communication device 1010 in FIG. 10. It would leave instructions on how to change the destination fax number to a fax device as 1066 in FIG. 10. The correction would be made to the process in step 1067 of FIG. 10 and the delivery process would be re-attempted in step 1064 of FIG. 10. This process is detailed by the dashed line process flow in FIGS. 14 and 15.

Transmitting Status Message

Once a status message has been updated in step 1065 of FIG. 10 after an attempt to deliver a fax in step 1064 of FIG. 10, the status message is transmitted via T1 connection 1015 of FIG. 10 to the Internet 1006 of FIG. 10 back to the originator IFS 940 of FIG. 9. This process is detailed in FIG. 14.

Managing and Delivering a Status Message

Figure 13:
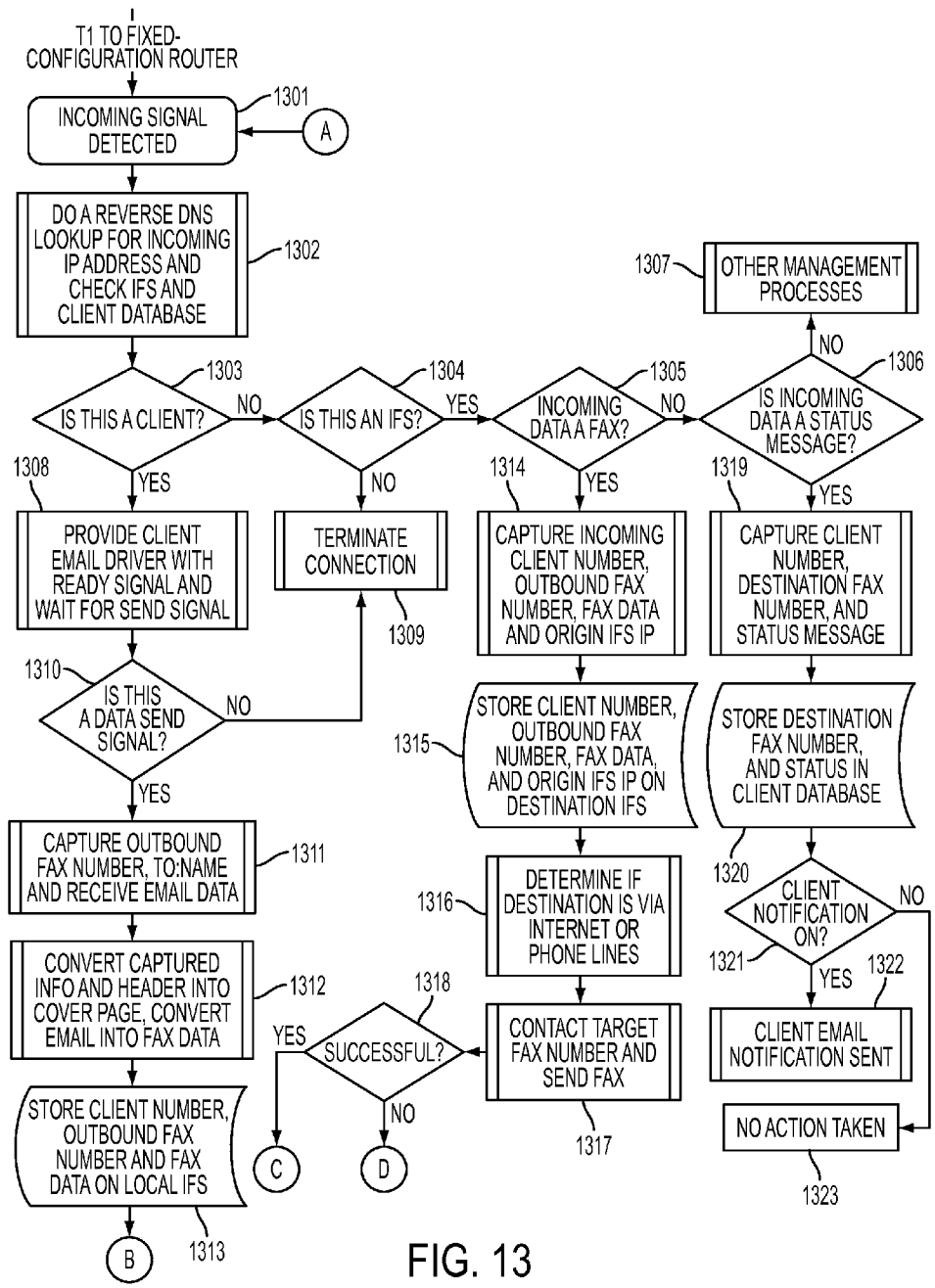
FIG. 13 shows a flow chart describing the general processing steps required for an Internet Fax Server to receive and deliver a fax or data to target equipment, such as shown in FIG. 7.

An incoming transmission to an IFS from another IFS is screened as detailed in FIG. 13, and determined to be a confirmation in step 917 in FIG. 9 in the form of an updated status message originated in step 1065 of FIG. 10. It is then determined if this process was originated by an Internet access client 903 of FIG. 9 or by a client using standard phone lines as 901 and 902 of FIG. 9. If it is an Internet client 903 of FIG. 9, the confirmation is sent in eMail form via Internet client connection 912 of FIG. 9. If the process was originated via standard phone lines 911 of FIG. 9, the status message is stored in a table of completed faxes as 947 of FIG. 9. This process is detailed in FIG. 13. A client may call via a standard telephone device 904 of FIG. 9 over standard phone lines 913 of FIG. 9 and, after passing call screening in incoming call screener 948 in FIG. 9, may check on the status of a fax they have sent. This process is detailed in FIG. 15.

Figure 16:
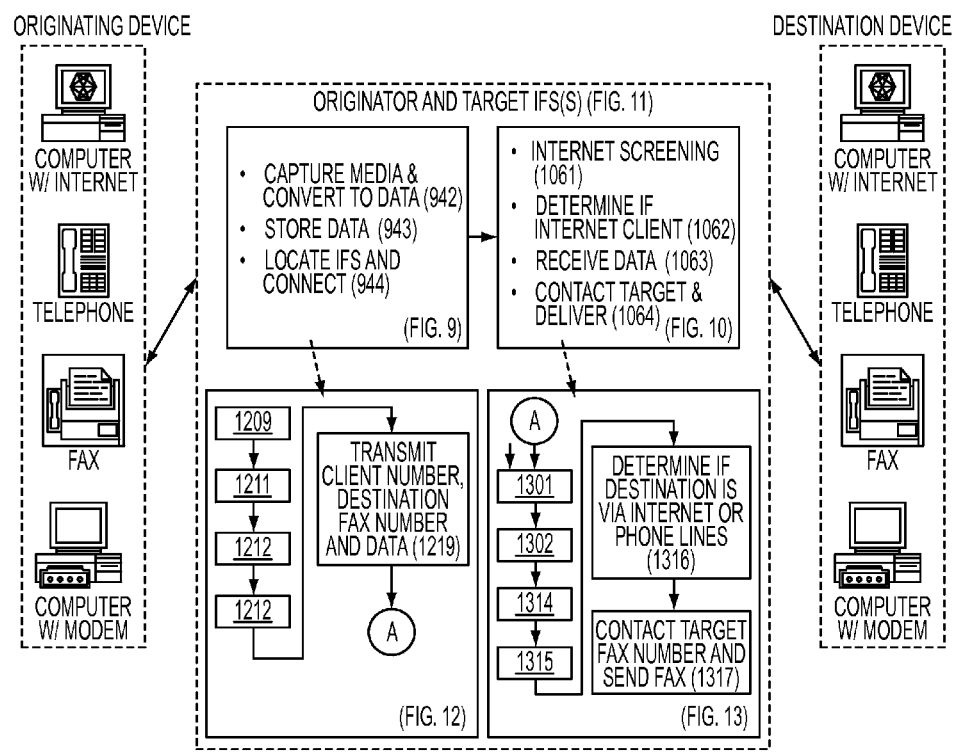
FIG. 16 shows relationships between portions of FIGS. 9, 10, 11, 12, and 13, in one consolidated diagram.

FIG. 16 includes schematic representations of portions of FIGS. 9, 10, 11, 12, and 13, and interrelationships thereof. Elements from FIGS. 9 and 10 are shown as included in one or a pair of IFSs. Each IFS can be an originator or a target device. Whether the target server is a different server or the same server as the originator server depends on (in the example embodiment in FIG. 12) the determination at step 1213. If the number is served by a local IFS, and if that local IFS is the same IFS that received the call, then "A" at the top of FIG. 13 (and at the bottom of FIG. 12) is a process connection within the same phone server.

Individual Service

When this invention is deployed, it is conceivable that individuals that are not clients as 1009 of FIG. 10 may wish to register their fax number and alternate eMail address with the service provider. This would allow faxes delivered with the invention from clients of the service provider as 701, 702 or 703 of FIG. 7 and targeted to that individual's fax number as 707 or 708 of FIG. 7 to be rerouted to that individuals eMail address as 709 of FIG. 7 using the Internet as 717 of FIG. 7. Details of this process are outlined in FIG. 13.

Charges and Billing

Figure 7:
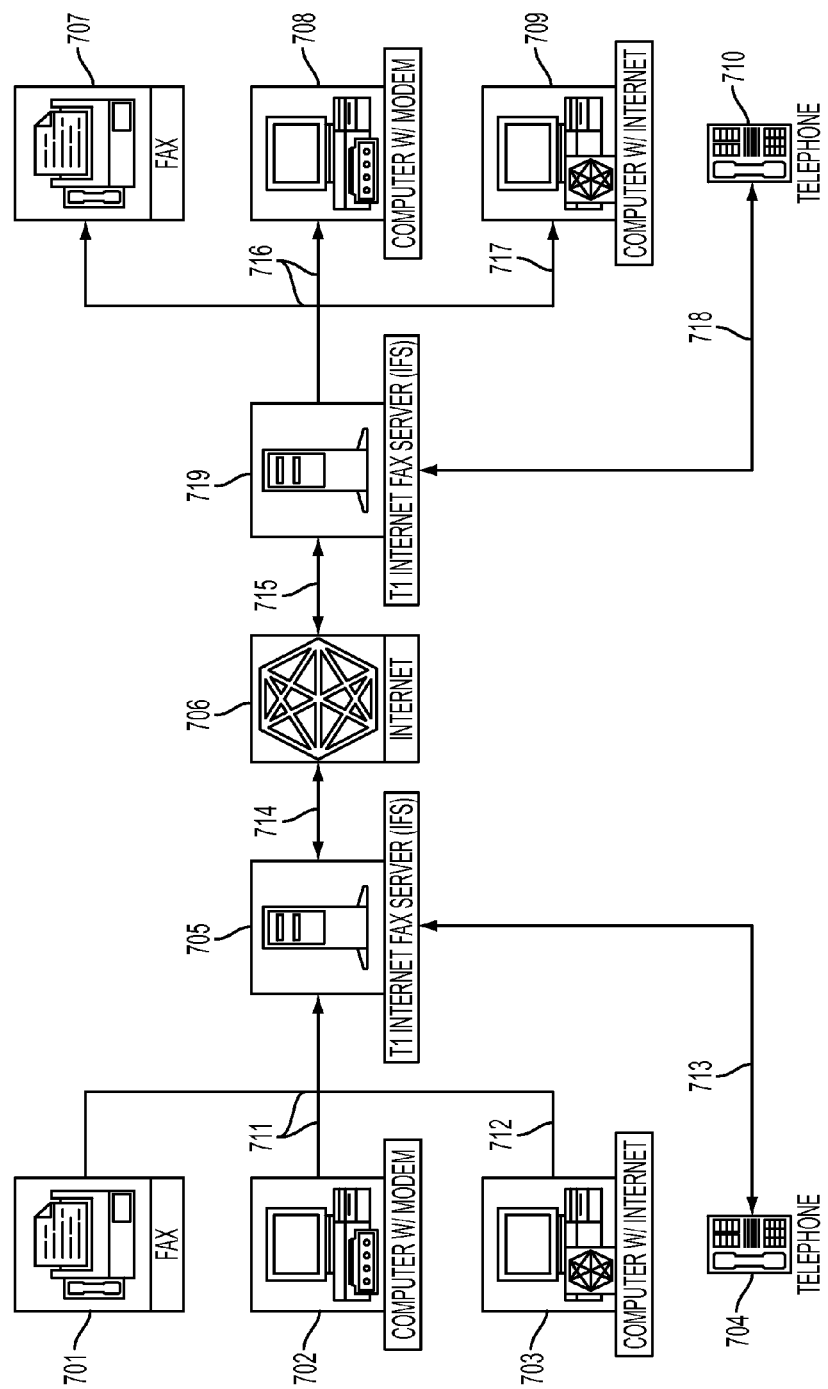
FIG. 7 illustrates the inter-relationships of the principle elements of a connection between the originator of a fax and the receiver.
Figure 8:
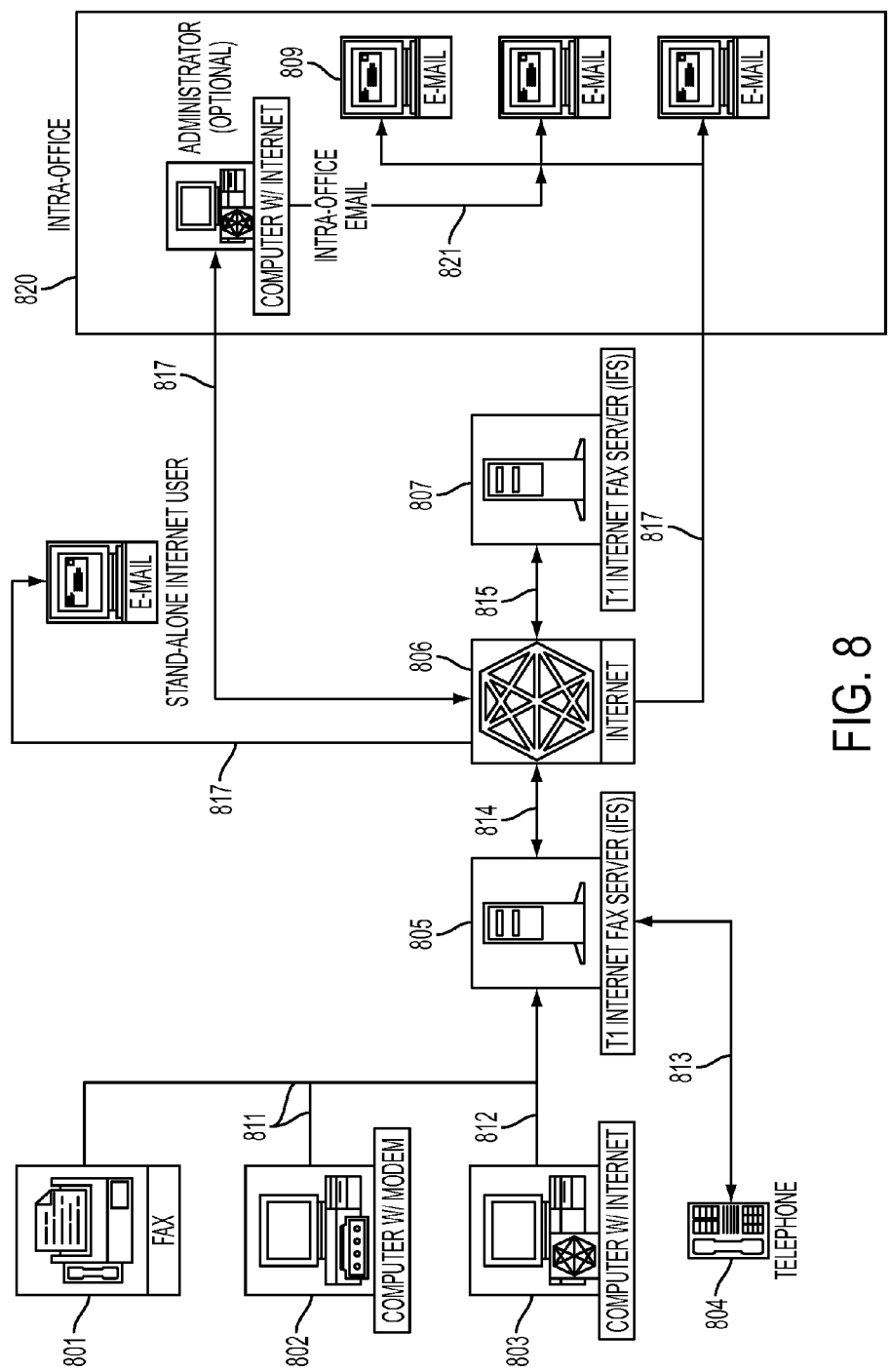
FIG. 8 illustrates the inter-relationships of the principle elements of a remote fax server where the invention is used to manage a client's fax traffic.

Normally, the Originator IFS 705 of FIG. 7 has the ultimate responsibility for the management of outgoing faxes. It initiates all connections to the target fax device with which it must communicate. It is the central location to which all reports concerning message status and disposition must flow. It screens incoming faxes to determine client status. Consequently, it is also the focus of billing data.

Since the goal is to reduce cost and enhance features of standard communication equipment, a fixed usage fee will be established. This may be a flat monthly rate for unlimited usage or a lower flat monthly rate with an additional flat fee per transmission. The originator would shoulder the complete burden of expense with no charge being incurred by a recipient. Thus, when the billing is prepared, the originator IFS can be poled to report that client's activity.

Extended Uses of the Invention

This invention, when fully deployed, will provide a backbone for other uses than the before mentioned. These uses, described hereafter, will use the invention with standard equipment and little or no modification so that any media that can be reduced to data that can be transmitted over the backbone may be delivered in batch mode or real time. This transmission will use algorithms to enhance functionality, for example encryption techniques for security or noise filtering. When modification is necessary, it will be noted in the description of that use.

Unified Mailbox

A unified mailbox is an electronic storage and delivery system that has the wherewithal to manage eMail, voice mail, faxes and other communications using an electronic medium. This invention as it stands, contains the ability when fully deployed to provide a client with a mailbox that will manage all electronic communications. Thus, it will be a unified mailbox.

Voice Mail

Since the invention uses the ability to capture, manage and send voice messages over the Internet, it is only natural that it would extend its network to the use of voice mail. Voice mail is not a new concept. In fact, many voice mail products exist that could be used with the invention. This use, however, is what is unique and new. A standard voice mail system could use the invention to deliver wide area messages without the use of long distance. Standard voice mail software would need to be added.

Voice Messaging

Further, since the invention has the ability to deliver recorded messages, a Voice Messaging system may be created. This would allow a client to call the service and record a message to be delivered to a distant destination without the use of long distance. The invention would use the Internet to deliver this message to a target IFS which, in turn would deliver the recording by phone to the recipient.

Paging and DTMF (Touch Tone) Transfer

There are two different types of paging available today, local and wide area. Companies that provide only local coverage sometimes find it hard to compete against those that offer wide area service. Clients that need wide area paging may find the cost of service to be prohibitive. The invention when fully deployed would allow paging networks of all kinds to use the invention for Internet delivery of DTMF or other signals necessary to activate paging services without using long distance. This use would require only minor additions, if any, to the billing and data gathering software within the invention and could provide service to all types of paging. This would also allow for the transmission of DTMF signals for any other purpose.

Radio Mail and Other Wireless Services

There are many new services being developed today that use wireless communications to deliver processed signals. All of these services have one thing in common: they use a data signal that can be transmitted over computer or telephone lines. The invention when fully deployed would already have the capability to manage both of these kinds of transmissions. All types of wireless services, including Radio Mail, could use the invention as a bridge between local and distant devices before transmitting by radio or other wireless mediums without the use of long distance. The only modification to the invention may be billing and data gathering if the client requested use of the invention by an unanticipated medium.

Delivery, Call In and Reroutes of Data

The invention as designed would allow for a feature to be given to select clients. This feature would provide the user an option to always have their data transmissions sent to the prescribed destination or to have it stored for retrieval. It is conceivable and even probable that a client that travels would have the data for a time period to be gathered at one local location. The client would then contact that location via the Internet or by other means and retrieve on demand the data from that time period for review. This ability would also allow clients to request that their information be rerouted to a temporary destination different from their primary destination.

Batch Transfer

The invention when fully deployed would provide clients with the possibility of batch (or delayed) communication via a modem or other device through the Internet. Although many people are using the internet and other services for this purpose now, the invention would allow non-Internet Subscribers to communicate without the use of long distance and without requiring either the sender or the receiver to purchase special equipment.

Online Live Data Transfer

The invention when fully deployed would provide clients with the possibility of real time communication via a modem or other devices through the Internet. Although many people are using the internet and other services for this purpose now, the invention would allow non-Internet Subscribers to communicate without the use of long distance. For example, there are people that will contact a company's computer to download software or data to their computer. If either party does not have Internet service, the initiator would have to make a long distance call to connect. The invention would allow this type of connection without long distance and without requiring either party in this example to purchase special equipment.

Unified Messaging

The invention as designed will allow for many types of conversions, including eMail to fax, fax to eMail, voice to eMail, Voice to Fax, eMail to Voice, eMail to Fax, etc. It is therefore possible to offer a client Unified Messaging when possible by sending all media to one device of the client's choosing without the aid of special equipment.

Real Time Voice and Data

Real Time live communication of voice or data transmissions are possible over the Internet. The invention as designed and when fully deployed would allow for all the before mentioned services to be available in Real Time live communication.

Figure 1:
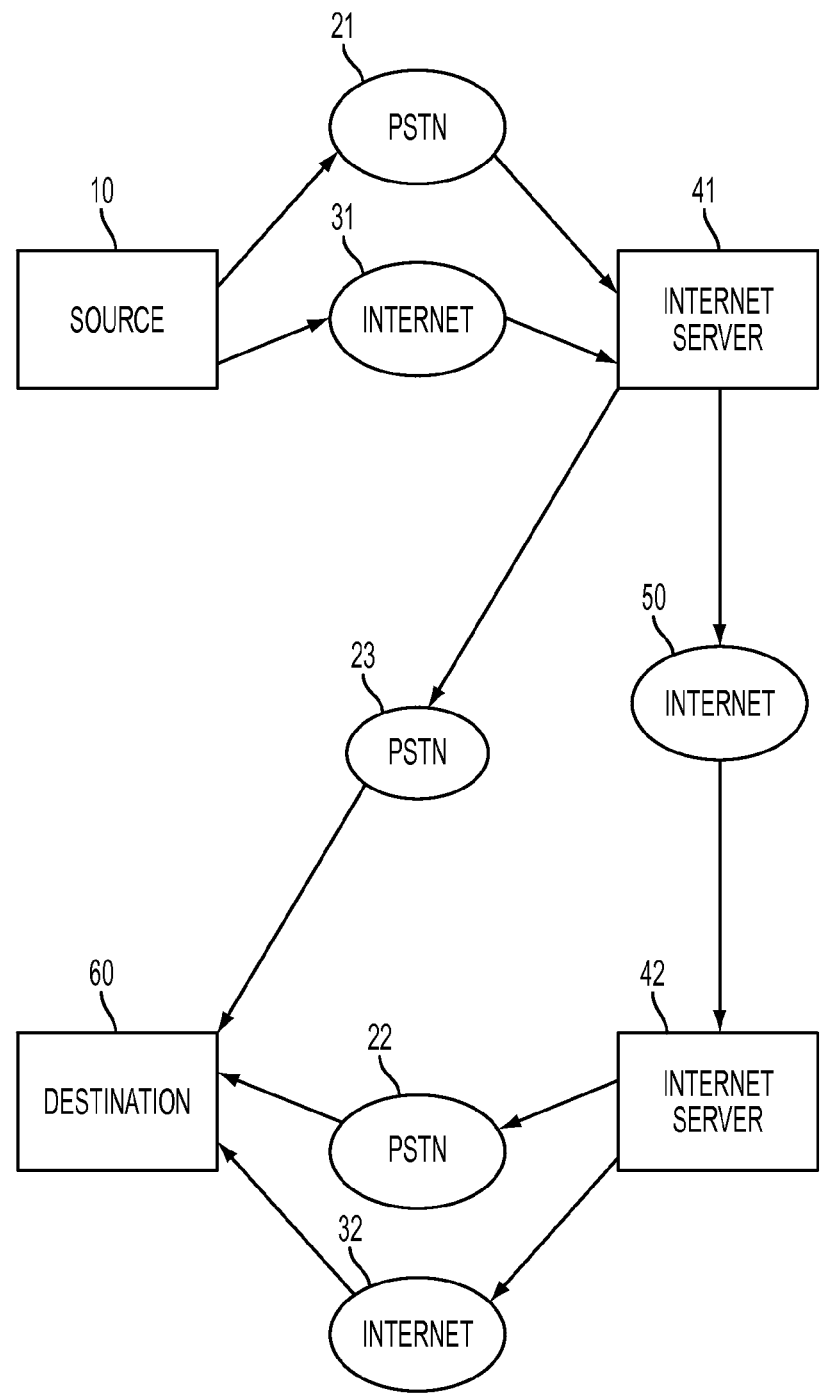
FIG. 1 is a block diagram illustrating an example embodiment of the general hardware configuration used to implement an Internet-integrated communications system of the present invention.

FIG. 1 is a block diagram illustrating an example of the general hardware configuration used to implement this invention. Items 10 and 60 of FIG. 1 represent telephony communications equipment at two nodes which are respectfully designated the source and destination for the purposes of this application. However, any node having telephony communications equipment capable of generating output may be deemed a source, any node having telephony communication equipment capable of receiving an input may be deemed a destination, and any node having telephony communication equipment capable of generating output and receiving input may be deemed both a source and a destination.

The telephony communications equipment of source 10 may include devices compatible with a telephony communications system that initiates a call connection by specifying among other things, a telephony destination address. The telephony communications equipment of destination 60 includes devices compatible with a telephony communications system that receives a call connection when their telephony destination address has been specified by another device. Examples of telephony communications equipment include analog and digital telephones, cellular telephones, facsimile machines, and dial-out data and/or fax modems.

FIG. 1 also shows Internet servers 41 and 42 which are included in a network of Internet servers, each of which provides access to Internet 50. Internet server 41 corresponds to source 10 and Internet server 42 corresponds to destination 62. Internet server 41 and 42, and their function, will be described in greater detail later in the application. The public switch telephone network (PSTN) is used to provide for communications between the telephony communications equipment at source 10 and Internet server 41. Similarly, PSTNs 22 and 23 are used to provide for communication between the telephony communications equipment 60 and each of Internet servers 41 and 42. As shown in FIG. 1, PSTNs 21-23 serve as telephony communications systems providing telephony communications equipment of various kinds access to other telephony communications equipment.

In addition, communication may be established via the internet protocol network (e.g., a local area network or the Internet) at 31 between telephony communications equipment at source 10 and Internet server 41, communication may be established via an internet protocol network at 32 between the telephony communications equipment 60 and Internet server 42.

By virtue of PSTNs 21-23 and Internet routes 31-32, the telephony communications equipment at source 10 and destination 60 are able to communicate with at least their respective Internet servers. Once communication is established between telephony communications equipment at source 10 or destination 60 and the corresponding Internet server, communication between the equipment at source 10 and destination 60 may be established over the Internet under the control of their respective Internet servers. For instance, as shown in FIG. 1, communications received by an Internet server from source 10 are directed toward destination 60 over Internet 50. As will be described later, Internet server 41 generally receives only the address of destination 60 along with communications from source 10. Therefore, a mapping such as a look-up table must be used to determine the address of Internet server 42 corresponding to destination 60 before communication over Internet 50 may be enabled.

In addition, as shown in FIG. 1, an alternative path exists for communications being sent between source 10 and destination 60. Namely, communications between source 10 and destination 60 may be sent through PSTN 23, bypassing Internet 50 and Internet server 42.

When transmitted over Internet 50, communications are received at Internet server 42 which is designated by Internet server 41 based on destination information provided in the communication. The communication then proceeds through either PSTN 22 or through an Internet protocol network at 32 to destination 60. In contrast, when transmitted over PSTN 23, communications are made directly from Internet server 41 to the telephony communications equipment at destination 60. Communications are directed over PSTN 23 by Internet server 41 when such a pathway presents the least costly use of communication resources. For example, as will be described in more detail hereinafter, the Internet server may determine that the most efficient or least costly communication can be performed using a PSTN when no Internet server is local to the destination.

Figure 3:
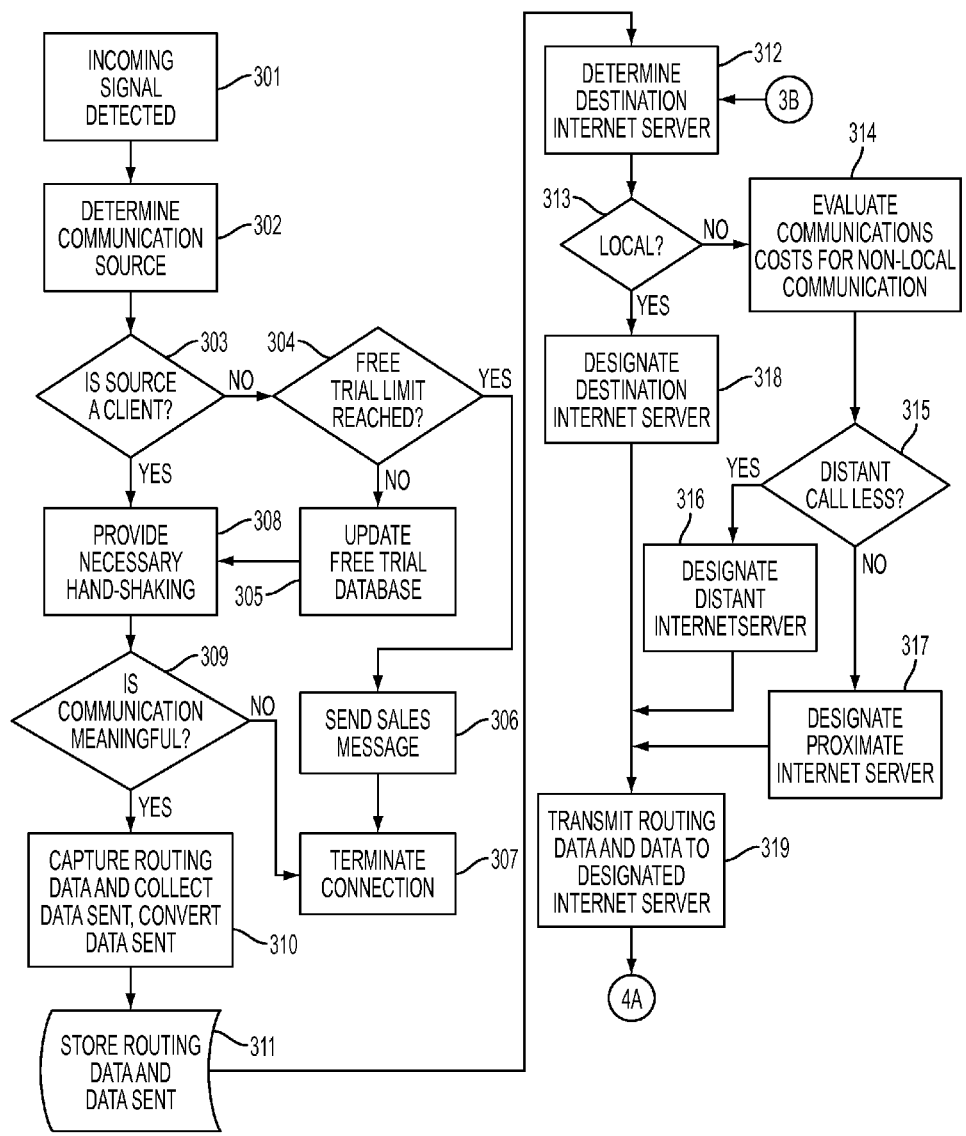
FIG. 3 is a flowchart demonstrating an example of the process performed by an Internet server in response to a communication from telephony communications equipment.
Figure 5:
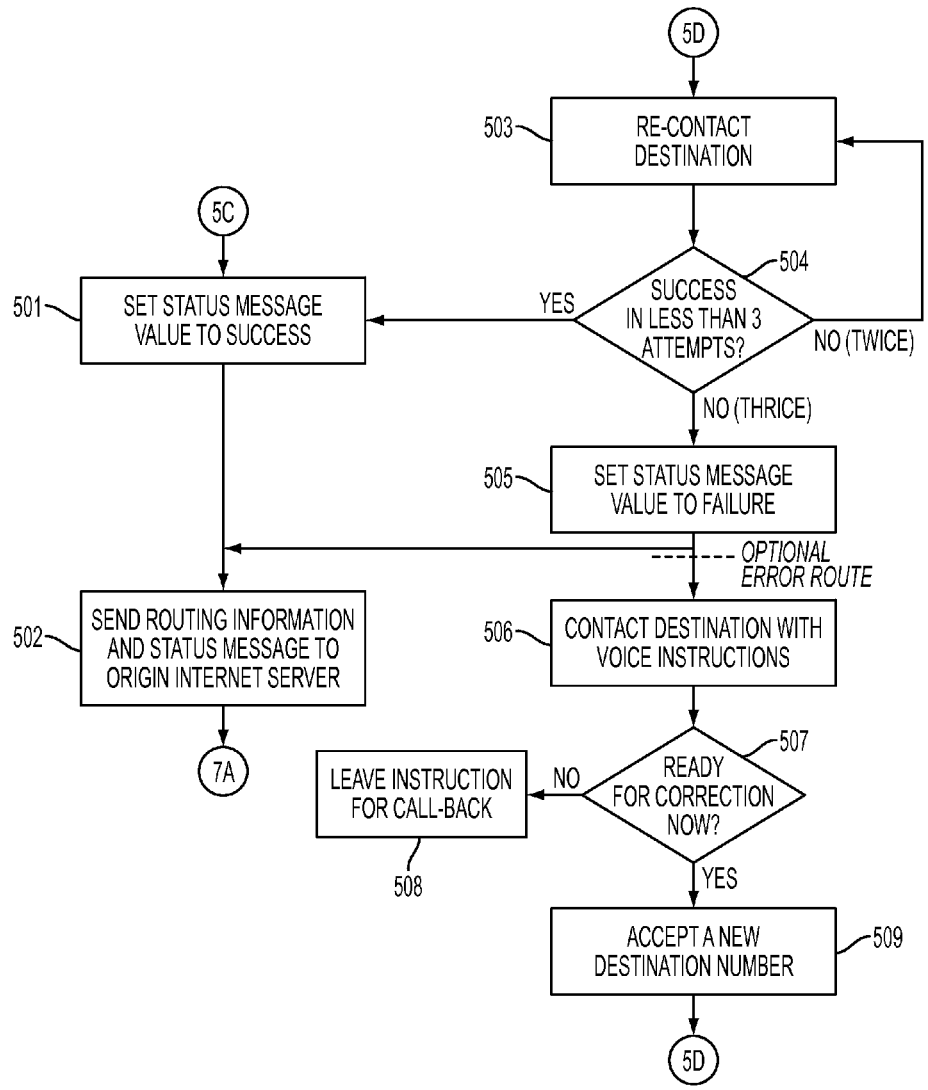

An example of the functions performed by an Internet server 41 is made apparent from FIGS. 3-5 which describe an exemplary process undertaken by the Internet server in accordance with one embodiment of the present invention, as applied in particular to communication by facsimile from a facsimile machine. The exemplary process described with respect to FIGS. 3-5 is also applicable to communications of other types of data, such as voice data which is further described later.

FIG. 3 describes the process performed by the Internet server when a communication is received from telephony communication equipment over telephony communication systems. Once the incoming communication is detected at the Internet server (step 301), the source of that incoming communication is determined in step 302 based on identifying information provided in that communication. For instance, the incoming communication may include an automatic number identification (ANI) code which may be compared to a database of codes corresponding to clients. The ANI code may correspond to the telephone number or other identifying code corresponding to the telephony communication equipment initiating the communication. At step 303, the Internet server determines whether the source of the communication is a client of the network system of Internet servers. At step 303, if the source of the communication is not a client of the network system, the process proceeds to step 304.

At step 304, the Internet server determines whether the source of the communication has reached a limit for free trial communications over the network. A selected number of free trial communications may be permitted on the network system by the present invention to telephony communication equipment at sources that are not clients of the network Internet servers. If the free trial limit is reached, the process proceeds to step 306 where a sales message may be sent to the telephony communication equipment initiating the communication, after which time the process proceeds to step 307 where the telephony communication system connection between the telephony communication equipment at the source and the Internet server is terminated. However, if at step 304, it is determined that the free trial limit has not been reached, the process proceeds to step 305 where the number of free trials corresponding to the telephony communication equipment initiating the communication is updated in storage. The process then proceeds from step 305 to step 308.

If at step 303, it is determined that the incoming communication was initiated by a client, the process proceeds to step 308. At step 308, the Internet server waits for further communication from the client, assuming that data is not provided in the initial communication. While waiting, the Internet server may generate a signal such as a dial tone and send that signal to the telephony communication equipment at the source so as to prompt further communication. Other handshaking may also be provided as necessary to elicit further communication from the telephony communication equipment at the source. The process then proceeds to step 309, where the Internet server determines whether the communication is meaningful. For instance, when communicating with a client having telephony communication equipment in the form of a facsimile machine, step 309 determines whether the communication is a facsimile. If the communication is not determined to be meaningful (e.g., the data format being transmitted is not recognized), the connection between the telephony communication equipment at the source and the Internet server is terminated at step 307. However, if the communication is determined to be meaningful in step 309, the process proceeds to steps 310 and 311.

In steps 310 and 311, routing information is captured and data is collected from within the communication. The collected data is converted, if necessary, to a form suitable for communication over the network (e.g., the Internet) based on established protocols such as the Internet protocol (IP). The routing information and converted data may then be stored as a precautionary measure in case there is a problem with transmission of the data to a destination. At step 310, the Internet server captures a telephony destination code (e.g., destination facsimile telephone number) provided by the telephony communications equipment that originated the communication. In addition, the Internet server receives the data (e.g., facsimile transmission data) from within the communication and converts the data received to an appropriate form (the Internet protocol (IP)) for sending over the computer network (the Internet). The process then proceeds to step 311 where the Internet server stores information such as the telephony destination code and converted data as a precautionary matter.

After steps 310 and 311, the process proceeds to step 312, where the telephony destination code specified in the communication is used to determine the destination Internet server. A mapping such as a look-up table or other suitable mapping may be used to relate the telephony destination code to a corresponding destination Internet server. The destination Internet server for telephony destination codes not included in a look-up table (or other suitable mapping mechanism) may be determined based on, e.g., area code when the telephony destination code is a telephone number. For instance, with respect to a facsimile communication, the Internet server uses a look-up table in step 312 to identify a destination Internet server based on the destination telephone number captured from within the communication in step 310.

In steps 313-315, the Internet server determines the most efficient method of communication with the telephony equipment at the destination. Specifically, step 313 determines whether any Internet server on the network is local to the destination, e.g., based on whether the destination Internet server identified in step 312 is local to the destination. If step 313 determines that the destination Internet server is local to the destination, the destination Internet server is designated for communication in step 318 before proceeding to step 319.

However, if step 313 determines that no Internet server is local to the destination, the assistance of some other available communication system will be needed to communicate with the destination. Another communication system may be any of plural systems including, for example, a telephony communications system (e.g., the PSTN) or even a LAN or WAN emulated telephone communications system. The Internet server evaluates the other available communications systems available, by determining in steps 314-315 the least costly communication using those other available communications system. For instance, in step 314, the Internet server evaluates communications costs associated with the other available communications systems. Based on the evaluation performed in step 314, an Internet server is selected to communicate with the other available communications systems in steps 315-317. For instance, the costs of communicating with the destination using one of at least two Internet servers in combination with the other available communications systems are compared in step 315, the least costly Internet server being designated for communication in steps 316 and 317.

A more detailed example of steps 314-317 follows, assuming for illustration purposes that a telephony communication system, e.g., the PSTN, is the other communications system used to facilitate communications to the destination. In such a situation, the communications costs may be evaluated in step 314 by comparing the costs of intraLATA communications over the PSTN to the interLATA communications over the PSTN. Long distance rates provide one possible criteria for comparing intraLATA and interLATA costs. If, in step 315, it is determined that the costs of interLATA communication are less than the costs of intraLATA communication, an Internet server outside the LATA of the destination is designated for communications in step 316 before proceeding to step 319. In contrast, if it is determined in step 315 that the costs of intraLATA communications are less than interLATA communications, an Internet server inside the LATA of the destination is designated for communication in step 317 before proceeding to step 319.

In step 319, routing data and payload data from the communication are stored in step 311 are communicated with the Internet server designated in the appropriate one of steps 316-318 for processing of data.

It should be noted that, in some situations, no communication is performed between Internet servers of the network. For instance, this situation may arise if no Internet servers are local to the destination, and the Internet server receiving communications from the source is determined to provide the least costly communication to the destination when combined with the other available communications systems.

FIGS. 4 and 5 illustrate an example of processes implemented by an Internet server that receives a communication over the Internet. At step 402, the Internet server detects an incoming communication. The incoming communication may have originated from telephony communications equipment, e.g., a computer connected to the Internet through an Internet Service Provider. Such a communication likely includes information sent through a modem. Alternatively, the communication may have been passed from a different Internet server. For instance, the encircled 4A corresponds to the output from the Internet server of FIG. 3 at step 319 in FIG. 3. Such a communication may include routing data and payload data as indicated, e.g., in step 319 of FIG. 3.

Once a communication is detected in step 402, the Internet server determines the source of the communication in step 403 by, e.g., evaluating information sent with the communication. For instance, the Internet server can determine whether an Internet address corresponding to the message source is the same as the Internet address corresponding to any of the clients or Internet servers in a database or look-up table.

If the source of the communication is determined to be a client in step 404, standard Internet protocol handshaking procedures are followed in step 405 to obtain the communication. Once the communication is received, it is generally handled in steps 406-409 and 411 in a manner similar to steps 307 and 309-311 of FIG. 3. For example, the communication is broken down into router data and payload data, converted into data appropriate for communication on the network, and stored for precautionary reasons. However, the conversion of step 408 differs from that performed in step 310 which converts data from a protocol used for communication over a telephony communications system from which it is received, while step 408 converts data from a protocol used for communications over a network system such as the Internet. Both conversion processes however conclude by proceeding to steps 312-319 for communications with other Internet servers.

If the communication is determined not to have been initiated at a valid source in steps 404 and 410, the process proceeds to step 411 where the connection is terminated. For instance, if the communication is determined not to have been initiated by a client in step 404, and the communication is determined not to have been initiated by an Internet server in the network in step 410, it is presumed that the communication was initiated by an impermissible source. For that reason, the connection is terminated in step 411.

Alternatively, if the communication is determined at step 410 to have been initiated by an Internet server in the network, the process proceeds to determine the type of communication received, e.g., as demonstrated by steps 413 and 419. For instance, the Internet server determines whether the communication is a fax in step 413, and whether the communication is a status message in step 419. Determinations like these have conventionally enabled the evaluation of specific status bits in the communication protocol, or the characteristics of the data within the communication itself.

More specifically, in step 413 of the illustrated embodiment, the Internet server determines whether the data sent within the communication represents a facsimile. If it is determined in step 413 that the communication received represents a facsimile, the process proceeds to steps 414-417 which break down the communication into router data and payload data, store this data, compare available resources for communicating, and determine communication resources to be utilized. Specifically, e.g., in step 414, the Internet server captures a telephony source code, telephony destination code, payload data and identification data for the Internet server from which the communication arrived. The Internet server then stores, in step 415, the information captured in step 414. The telephony server compares available resources for communicating and determines which of the available communication resources to be utilized in step 416. The resources of step 416 are then used to communicate the payload data in step 417.

The Internet server evaluates communication success in step 418. If the communication is deemed successful, step 418 forwards the process to step 501 of FIG. 5 where a status message is updated to reflect the successful status. Thereafter, the process proceeds to step 502 of FIG. 5 where the updated status message is sent to the origin Internet server.

However, if the communication is not deemed successful in step 418, process proceeds to steps 503 and 504 of FIG. 5 where the communication is repeated a predetermined number of times (e.g., 3). If the communication is successful after the predetermined number of attempts, the process proceeds to steps 501 and 502 for the processing described above. If the communication is not successful after the predetermined number of attempts, the process proceeds to step 505 where a status message is updated to reflect failure status. Thereafter, the process proceeds to step 502 where the updated status message is sent to the origin Internet server.

If step 413 determines that the communication does not represent a facsimile, the process proceeds to step 419 where the Internet server determines whether the message is a Status Message like, e.g., those sent in step 502 of FIG. 5. If the communication is deemed a Status Message, the Internet server performs the functions specified in steps 421-425. Specifically, the Internet server captures, in step 421, routing information and status data from the communication, and stores the same in step 422. For example, the Internet server captures telephony source code, telephony destination code and a status message from the communication, and stores the same in a client database. The Internet then proceeds to steps 423-425 to notify the client of the status message if client notification is set via, e.g., a flag in the database.

However, if the Communication is deemed to be other than a Status Message, the Internet server performs functions according to a different management process, as indicated in step 420. Such processing may be with respect to, e.g., communications including voice data which will later be described in more detail.

As an alternative to sending Status Messages in step 502 to indicate a failure in communication, an optional error processing may be conducted in accordance with steps 506-509 of FIG. 5. Specifically, as shown in step 506, the Internet server may contact the destination with voice instructions, e.g., to help alleviate potential problems giving rise to the failure. For instance, the voice instructions might direct the user to turn on a piece of telephony communications equipment. The alternative error process then proceeds to step 507 which detects whether the contact is ready for correction now that the voice instructions are sent. If the contact is not ready for correction in step 507, instructions are left for a call-back in step 508. However, if the contact is ready for correction in step 507, a new destination number is accepted in step 509 and the process proceeds to step 503 where the new destination number is sued to again attempt communication.

Voice Data Transmission

As mentioned previously, the process described via the specific embodiment of FIGS. 3-5 accommodates voice data being communicated between source 10 and destination 60. For instance, when voice data generated by telephony communications equipment is communicated over the telephony communications system and received by an Internet server, the server may operate essentially as shown in FIG. 3, in which case the handshaking of step 308 may not be needed.

Similarly, when an Internet server receives communications from the Internet containing voice data, the Internet server may operate as shown in FIG. 4. Specifically, communications containing voice data are handled by applying the process shown in steps 414-417 with respect to communications containing facsimile data. As with the facsimile communications, source identifying information (e.g. telephony source codes), destination identifying information (e.g., telephony destination codes), identifying information for the Internet server corresponding to the source, and the data itself are captured in step 414 and stored in step 415. Also similar, is the procedure for communicating the data to the destination specified, where the method of communication is determined in step 416 based on the factors previously espoused, where the communication is attempted using the determined method in step 417, and where status updating and post-communication activity is handled in steps 418 and 501-509.

The illustrated system therefore provides for communications of voice data over the Internet using existing, unmodified telephony communications equipment connected to telephony communications systems. Because communications of voice data over the connectionless networks such as the Internet are presently enabled using protocols such as RTP (real-time transport protocol), the system also provides for real-time voice data communications between a source and destination over the Internet using existing telephony communications systems (e.g., PSTN) and equipment (e.g., analog and digital telephones). As such, the present invention provides real-time voice data communication over the Internet without requiring special communications hardware (e.g., computer adapters) at the source or destination, and without requiring special communications equipment (e.g., ISDN communication lines) to replace existing telephony communications systems (e.g., the PSTN) presently connected to the telephony communications equipment at the source and destination.

Vantage Point at Source

From the vantage point of an initiator at source 10, the communication functions performed by the present invention are transparent, or nearly transparent. That is, when compared to conventional communications over the PSTN, the only difference noticed by an initiating user source 10 is that an Internet server must be accessed before entering destination identifying information (e.g., telephone number or E-mail address of destination) and sending information (e.g., voice or data).

Specifically, when wishing to communicate via telephone system interfacing equipment over the PSTN, an initiator at source 10 must access an Internet server by submitting identifying information corresponding to that Internet server. Examples of conventionally used identifying information include a telephone number, Internet address, or some recognized code corresponding to either (e.g., batch code processing or the like).

Access to the Internet server may occur automatically upon the occurrence of certain events (e.g., the telephony communications equipment goes "off-hook"), so that the connection to the Internet server is virtually transparent to source 10. By way of example, this may be implemented by providing an interface (hardware and/or software) for detecting the occurrence of such a triggering event and automatically establishing a direct tie to the Internet server. AIN services may also be utilized to achieve this function.

Once the initiator, at source 10, has established access to the Internet server, for example through an Internet Service Provider (ISP), communication may be conducted in the ordinary manner, whereby an initiator at source 10 submits a telephony destination code followed by payload data. Conventional methods for submitting a telephony destination code include, for example, numeric entry and voice recognition systems. The Internet server may or may not prompt input of the telephony destination code from the initiator using conventional means (e.g., audio or visual indicator or request) once access has been established.

Figure 6:
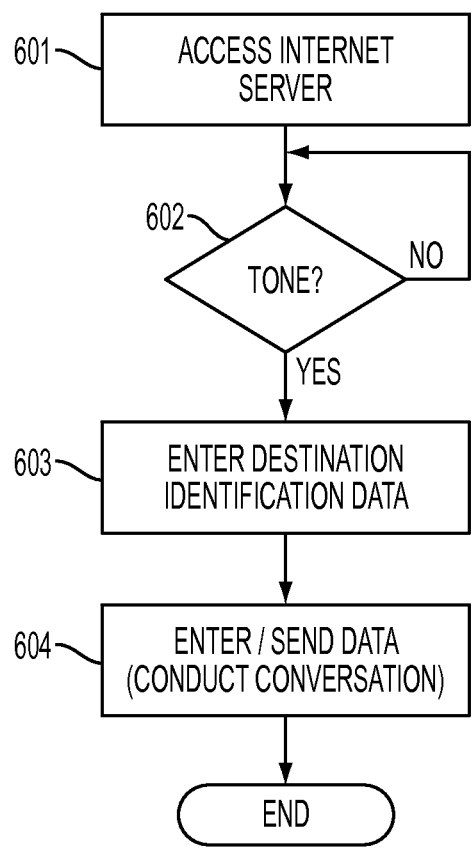
FIG. 6 is a block diagram illustrating an example of how communication is initiated at the source telephony communications equipment.

FIG. 6 provides a brief example of how in operation of the illustrated system communication may be initiated by an initiator at source 10 using the present invention. At step 601, the initiator accesses the Internet server by entering identifying information manually. In step 502, the initiator at source 10 waits for an indication from the Internet server of successful access (e.g., an auditory tone). Although such an indication may or may not be provided by all Internet servers, such an indication may be useful in achieving transparent communications, particularly when used in combination with a process for automating identification of and access to the Internet server such as the processes described above.

More specifically, for purposes of this example, assume that the telephony communications equipment being used at the source is a standard analog telephone. When the Internet server is accessed automatically and an auditory tone is provided by the Internet server in response to access, a person wishing to initiate communications using the telephone hears the tone generated by the Internet server in place of the dial tone. In response to that dial tone, the initiator simply inputs the destination telephone number (i.e., the destination identifying information) and proceeds with the communication, as described in steps 603 and 604. As such, the performance of communication functions by the present invention remain transparent to the initiator of a communication.

Vantage Point at Destination

From the vantage point of destination 60, the communication functions performed by the present invention are completely transparent. There is no need for telephony communications equipment at destination 60 to input any special access or identifying information because the communication has already been initiated with destination 60 by source 10. That is, the identification information for the source and destination has already been established. Communication initiated based on the identification information will continue because, once communications are initiated, the telephony communications system creates a virtual circuit between the telephony communications equipment at the destination and the corresponding Internet server which is maintained until the communication is terminated (e.g., dial tone upon "hang up"). Furthermore, the Internet servers corresponding to the source and destination have been determined. For that reason, destination 60 perceives communication performed using the system and method of the present invention as ordinary communication.

The vantage point of destination 60 is therefore similar to the vantage point of a person receiving telephone calls from sources having accounts with different telephone carriers—although the pathways over which each telephone call likely differ, the difference is transparent to the recipient.

Figure 2A:
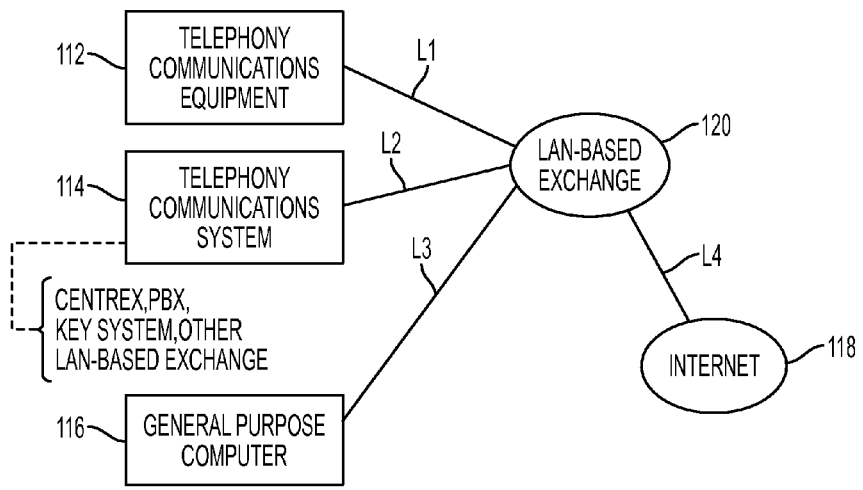
FIG. 2A is a block diagram of an exemplary embodiment of an integrated telephony system of the present invention.

FIG. 2A is a block diagram of an exemplary embodiment of an integrated telephony system of the present invention. The illustrated embodiment of the present invention is intended to comprise the illustrated integrated telephony system, which comprises several different elements connected together, it may also comprise a subset of the illustrated systems. Alternatively, it may comprise another system which in turn includes other systems and network elements beyond those shown together with all or a subset of those elements shown.

In the illustrated integrated telephony system, many types of telecommunications and/or information technology elements are connected to a LAN-based system, i.e., a LAN-based exchange 120 for facilitating the exchanging of telephony and/or non-telephony traffic among the various elements connected thereto.

LAN-based exchange 120 may serve to emulate a traditional telephony communications system, such as a centrex, a PBX, a key system, or another type of telephony communications system. Since it is LAN-based, it can also be implemented so that it concurrently serves as a traditional LAN, offering networking capabilities for non-telephony traffic (e.g., Internet email, wordprocessing documents) as well as for telephony traffic (e.g., faxes, two-way real time voice communication, and more specifically, communications between origination/destination telephony communications equipment (e.g., analog/digital dial-out telephone number addressed telephone sets and standard dial-out telephone number addressed faxed machines).

Accordingly, FIG. 2A shows LAN-based exchange 120 coupled to a telephony communications equipment (comprising, e.g., standard telephone set (s), fax machines, and dial-up PSTN-interfacing modems) 112, telephony communications systems (traditional and LAN-emulated) 114, a general purpose computer (e.g., a PC or workstation) 116, and the Internet 118.

Telephony communications equipment 112 is connected to LAN-based exchange 120 via transmission link set L1 (a set comprising one more links). Telephony communications system 114 is connected to LAN-based exchange 120 via transmission link set L2. General purpose computer 116 is connected to LAN-based exchange 120 via transmission link set L3. Internet 118 is connected to LAN-based exchange 120 via transmission link set L4. In the illustrated system, link sets L1, L2, Ld3 and L4 are all bidirectional. Link sets L1 and L2 each carry mainly just telephony traffic, while link sets L3 and L4 each carry both telephony traffic and non-telephony traffic.

General purpose computer 116 may be equipped with appropriate multimedia and other interfacing equipment to facilitate telephony applications (over its link set connection L3 to LAN-based exchange 120) such as sending and receiving Internet faxes and other types of virtual faxes, real-time duplex voice and/or video communications (e.g., emulating a video phone or a voice telephone), and virtual or emulated modem communications. In addition, general purpose computer 116 may further be connected to standard telephony communications equipment, such as an analog phone set or a dial-out type fax machine, and may be provided with an interface for receiving the signals from such devices, converting such signals to the appropriate format (e.g., analog to digital conversion) and forwarding them to LAN-based exchange 120 via link set L3.

Figure 2B:
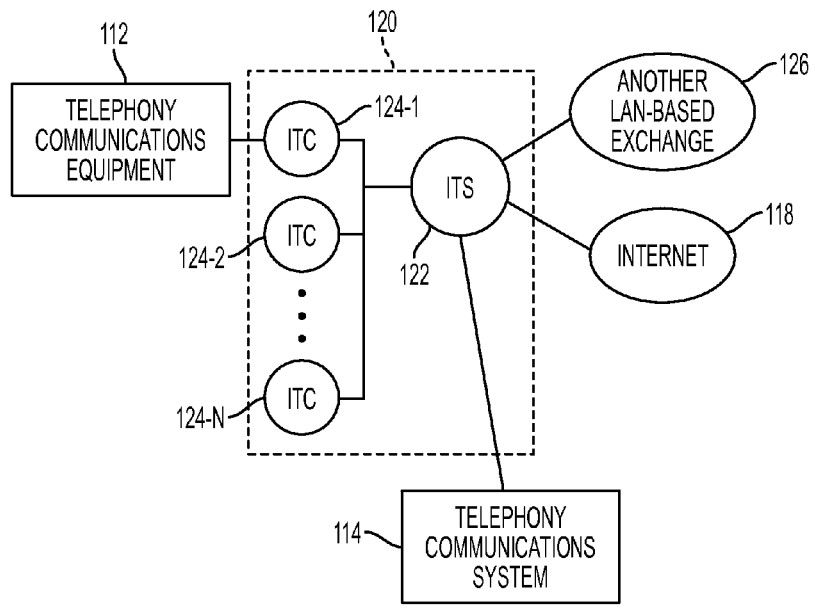
FIG. 2B shows a LAN-based exchange implemented as a client/server architecture.

FIG. 2B shows LAN-based exchange 120 implemented as a client/server architecture, with one or a number of hosts serving as Internet telephony servers (ITSs) 122 and the rest of the networked hosts being Internet telephony (ITCs) clients 124-1, 124-2, . . . , 124-N.

Separate local ITSs (LITSs) and/or public ITSs (PITSs) may be provided at remote locations, the distance therebetween possibly being considered inter-lata, and thus requiring payment of long-distance rates. In setting up such a multiple PITS and/or LITS network, according to one embodiment, the ITSs register with each other (i.e., notify each other) their respective service areas (area codes, NXX, LITSs, . . . ), and the ITCs each register with their respective ITSs that serve them. Standard telephone connections (phone, fax) will be registered with the ITS (LITS or PITS) that is serving each such standard telephone connection. Registering the telephony destination address may be done by, e.g., using a web browser interface, dialing directly into the ITS to register pertinent information, or interfacing with a manual operator.

If no local ITS is available for a long distance call, i.e., there is no serving ITS close enough to the telephony destination address to completely avoid long distance charges, then the call should be routed to the next cheapest in terms of long distance costs ITS (PITS or LITS).

Figure 2C:
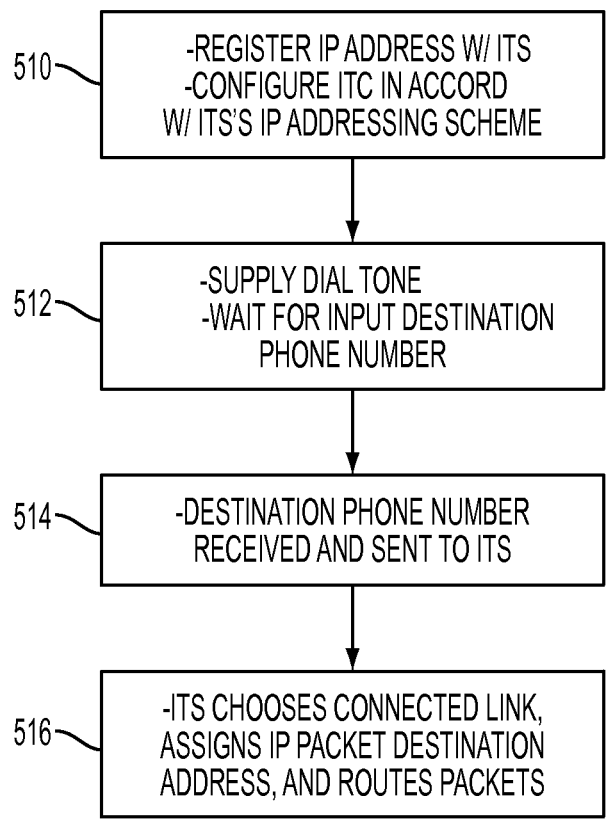
FIG. 2C illustrates a high-level flow chart of some steps forming part of the general operation of a telephony client.

FIG. 2C illustrates a high-level flow chart of the general operation of the telephony clients 124-N shown in FIG. 2B, in accordance with a particular exemplary embodiment. As indicated in step S10, a telephony client 124-N registers its IP address with its associated telephony server. This may be done, e.g., during bootup time, if telephony client 124-N is a software implementation. In addition, in step S10, the telephony client 124-N will be configured in accordance with the IP-compliant addressing scheme of its associated telephony server 122.

In step S12, telephony client 124-N supplies a dial tone to a handset speaker (not shown) or a multimedia speaker (not shown) (for hands free operation) to emulate the protocol of a telephony communications equipment (via a dial tone generation device which may be provided as a peripheral to the computer running the client, or may be generated by appropriately controlling an audio output port of the computer). Telephony client 124-N will then wait until the user inputs the destination phone number (via an appropriate input device (not shown), e.g., a handset with a telephone-type key pad, a standard computer keyboard, or through a microphone input and an appropriate linked software-implemented speech recognition interface).

In step S14, the destination phone number is received and sent to Internet telephony server 122. In step S16, Internet telephony server 122 will then choose the connected link through which it should route the phone call, assign an Internet protocol packet destination address corresponding to the telephony destination phone number, and route its packets accordingly.

The above-described variations of an Internet telephony server (ITS) can be implemented locally in a business or agency much like a PBX, and/or one can be implemented publicly and shared by independent businesses and individuals and used for routing to other public or local ITSs and provide an interface to existing telephony communications systems.

Additional housekeeping information may be embedded into the protocol used to transmit call information (housekeeping as well as payload). Such additional housekeeping information may include an identifier indicating the type of call being made (some example call type categories are: voice, fax, video, videoconference, virtual modem (VM), bidirectional transmission (BDX), directional transmission (DX)). This information may be used by an ITS, by simply redirecting certain types of calls, depending upon its type. Certain call types (e.g., faxes) are well-suited for handling by other systems. For example, incoming faxes could be intercepted at the ITS (rather than sent to the Internet telephony client (ITC)) and sent to a fax server or to an email server for emailing to the intended recipient.

A simple flow of such a subsystem (provided as part of an ITS, an ITC, or even provided as a separate system or as a subsystem in other applications) may be as follows:
(1) Determine the type of call (fax, voice, data, video, . . . ).
(2) Determine routing and connect to the appropriate application (server).
(3) Perform the necessary protocol and/or data type (e.g., digital verses analog) conversions.

An ITS may handle voice and fax calls in the following manners, respectively.

If a voice call is received (a call may be switched to the ITS via AIN or another mechanism), the ITS determines that the call is a voice call. If the telephony destination number is served by a client (ITC) of the ITS, the ITS will attempt to talk to the ITC. If the ITC is not responding, the ITS may arrange for the sending of a message to the intended recipient of the voice call.

If the ITC responds, it announces (audibly, visually, and/or through other means) the receipt of a new call, and then awaits a response from the receiving user. If no such response is received, the ITC can act accordingly (e.g., take a voice mail message or receive a text message).

If the receiving user answers the call, appropriate conversions (at the ITC or the ITS, depending upon the type of receiving equipment and its connection to the ITS) will be implemented to convert the IP-carried voice data to a form suitable for the voice interface at the receiving end, and vice versa. The ITS will wait for all parties but one to disconnect, before terminating the call.

If a fax is received, and the ITS is connected to either a standard fax machine or to a fax server (either directly or via an ITC), the fax information will need to be converted accordingly to be transmitted over an Internet telephony LAN, and then converted back to the appropriate format for receipt by the fax machine or fax server.

If the ITS is serving as a fax server, it may simply take the fax and email it to the destination user's email address, and, if the ITS has been configured to do so, it may then notify the party sending the fax and/or the fax recipient that the fax has been forwarded (emailed).

Some of the benefits of an ITS/ITC architecture include, but are not limited to: the elimination of separate wiring for phone and data, by providing for the running of all telephony applications over data wiring (company intranet (s), LANs, and WANs); the use of a client/server paridyme which facilitates scalability of telephony services (e.g., new LITSs may be easily added); the reduction in complexity and expense of switched networks (public, private and hybrid); the replacement of switching with a system which allows hundreds or thousands of cables required for switched systems to be reduced to one or several; the more efficient use of local phone lines; the reduction of all separate lines and/or facility groups (e.g., trunk groups, multiline hunt groups, etc.) to one (or two for redundancy) high bandwidth connection; a reduction in telephony personnel, since all telephony activity will be done over a data network and regular computers (no special personnel or training will be needed for special exchange equipment, wiring, protocols, etc.); voice and data can be more tightly coupled since they are both carried over the same network and applications on the same computers; an ITS can determine the type of each incoming call (e.g., fax, voice, . . . ), thus facilitating the provision of new and enhanced features (e.g., one number can be used for a person's voice and fax; voice calls are delivered, and fax calls are intercepted and automatically sent (e.g., emailed) to the receiver); and a reduction in the cost of long distance calling by routing over the Internet.

While the invention has been described by way of example embodiments, it is understood that the words which have been used herein are words of description, rather than words of limitation. Changes may be made, within the purview of the appended claims, without departing from the scope and spirit of the invention in its broader aspects. Although the invention has been described herein with reference to particular means, materials, and embodiments, it is understood that the invention is not limited to the particulars disclosed.

What is claimed is:

1. An apparatus comprising:
   a plurality of servers configured to communicate with and relay both IP addressed overhead and IP addressed payload data from a plurality of originating communication devices,
   a first originating communication device of the plurality of originating communication devices including:
      a user interface configured to receive call initiating input from a human operator, the user interface including a targeted destination input, and an online indicator operable to give a human perceptible signal when the first originating communication device is operatively connected to a first server of the plurality of servers,
   a second originating communication device of the plurality of originating communication devices being operatively connected to a second server of the plurality of servers,
   the second server including a screener configured to, when the first server calls the second server as a result of a first initiated communication from the first originating communication device to a first remote destination, receive first IP addressed data, and the screener being configured to, when the second originating communication device sends a second initiated communication to a second remote destination, receive second IP addressed data from the second originating communication device, at least the first initiated communication being initiated by a respective human operator directly operating the first originating communication device using the user interface while the first originating communication device is operatively connected to the first server, wherein:

the first initiated communication is for sending first payload data from the first originating communication device to the first remote destination specified via the targeted destination input, the second initiated communication is for sending second payload data from the second originating communication device to the second remote destination, the second remote destination requiring traversal of another phone network, the second server of the plurality of servers being configured and connected within a first network so that the first IP addressed data and the second IP addressed data are processed differently, depending on a next portion of a respective communication pathway for a call, whereby, for the first initiated communication corresponding to the first IP addressed data, the first payload data is converted from IP addressed payload data to a signal for the another phone network, and whereby, for the second initiated communication corresponding to the second IP addressed data, the second payload data is sent on a next portion of the respective communication pathway without converting the second payload data from IP addressed payload data to the signal for the another phone network since the second payload data was received by the second server as IP addressed data, the first server includes a server determination mechanism to determine whether an outbound fax number, specified via the targeted destination input, is served by a corresponding local server of the plurality of servers, and when the server determination mechanism determines that the outbound fax number is not served by a corresponding local server, the server determination mechanism is configured determine whether a delivery call costs less as an intra-lata delivery call or as an inter-lata delivery call, and based on the determination regarding the cost of the delivery call, the server determination mechanism is configured to contact either a first target server to dial a destination fax device via the intra-lata delivery call and send a fax formatted message, or a second target server to dial the destination fax device via the inter-lata delivery call and send the fax formatted message.

2. The apparatus according to claim 1, wherein the targeted destination input includes a touch tone input.

3. The apparatus according to claim 1, wherein a targeted destination input for the second originating communication device includes an email address input field.

4. The apparatus according to claim 1, wherein a targeted destination input for the second originating communication device includes an IP address input field.

5. The apparatus according to claim 1, wherein the first server is capable of providing a requisite signal to the first originating communication device so that the human perceptible signal can be given.

6. The apparatus according to claim 1, further comprising a pathway wherein the first originating communication device, via the first server, is in communication with the second server via the pathway using IP addressing.

7. The apparatus according to claim 6, wherein the pathway includes the first network.

8. The apparatus according to claim 1, wherein the screener is configured to receive and act upon the first IP addressed data and the second IP addressed data.

9. The apparatus according to claim 1, wherein the first IP addressed data and the second IP addressed data each include connection initiator identifying information.

10. The apparatus according to claim 9, wherein the connection initiator identifying information includes an AIN number.

11. The apparatus according to claim 9, wherein the connection initiator identifying information includes customer information.

12. The apparatus according to claim 1, wherein the first IP addressed data and the second IP addressed data each further include outbound number information corresponding to a destination of the communication.

13. The apparatus according to claim 1, wherein the another phone network includes a switched telephone network.

14. The apparatus according to claim 1, wherein the first originating communication device is a standard telephone device capable of communicating voice over standard phone lines.

15. The apparatus according to claim 1, wherein the first originating communication device is standard fax equipment.

16. The apparatus according to claim 1, wherein the first originating communication device is a wireless communication device using a processed data signal delivered wirelessly.

17. The apparatus according to claim 1, wherein the first originating communication device includes a touchtone device, and wherein the first payload data includes DTMF signals.

18. The apparatus according to claim 1, wherein the second originating communication device is a computer with an Internet connection.

19. The apparatus according to claim 1, further comprising an off-hook determiner configured to determine that an off-hook triggering event has occurred in the first originating communication device.

20. The apparatus according to claim 1, wherein the targeted destination input is operable upon the first originating communication device getting access to the first server.

21. The apparatus according to claim 1, wherein the first server and the second server each include a respective destination numbered determination mechanism configured to determine a destination number of a given call placed by a respective originating communication device.

22. A method comprising:

communicating with and relaying both IP addressed overhead and IP addressed payload data, the payload data originating from a first originating communication device and a second originating communication device, the second originating communication device being operatively connected to a second server, the first originating communication device including:

a user interface configured to receive call initiating input from a human operator, the user interface including a targeted destination input, and an online indicator operable to give a human perceptible signal when the first originating communication device is operatively connected to the first server; and during the communicating with the first originating communication device and the second originating communication device, receiving, by the second server, first IP addressed data and second IP addressed data of corresponding first and second initiated communications, the first initiated communication being initiated by a human operator directly operating the first originating communication device using the user interface while the first originating communication device is operatively connected to the first server, the first initiated communication being for sending first payload data from the first originating communication device to a first remote destination, the second initiated communication being for sending second payload from the second originating communication device to a second remote destination, the second remote destination requiring traversal of another phone network, and processing the first IP addressed data and the second IP addressed data differently, by the second server, depending on a next portion of a communication pathway for a first call, whereby, for the first initiated communication corresponding to the first IP addressed data, the first payload data is converted, after a point in time at which a screener, included within the second server, received the first IP addressed data, from IP addressed first payload data, to a signal compatible with the another phone network, and whereby, for the second initiated communication corresponding to the second IP addressed data, the second payload data is sent on a next portion of a communication pathway for a second call without converting the second payload data from IP addressed second payload data to the signal compatible with the another phone network, wherein:

the first server determines whether an outbound fax number, specified via the targeted destination input, is served by a corresponding local server of the plurality of servers, and when the first server determines that the outbound fax number is not served by a corresponding local server, the first server is configured to determine whether a delivery call costs less as an intra-lata delivery call or as an inter-lata delivery call, and based on the determination regarding the cost of the delivery call, the first server is configured to contact either a first target server to dial a destination fax device via the intra-lata delivery call and send a fax formatted message, or a second target server to dial the destination fax device via the inter-lata delivery call and send the fax formatted message.

23. The method according to claim 22, wherein the first server is operatively connected to and serves multiple originating communication devices.

24. The method according to claim 22, wherein the targeted destination input includes a tone input DTMF.

25. The method according to claim 22, wherein the targeted destination input includes a phone number input for receiving phone numbers via a touch pad.

26. The method according to claim 22, wherein a targeted destination input of the second originating communication device includes an email address input field.

27. The method according to claim 22, wherein a targeted destination input of the second originating communication device includes an IP address input field.

28. The method according to claim 22, wherein the first server is capable of providing a requisite signal to the first originating communication device so that the human perceptible signal can be given.

29. The method according to claim 22, wherein the second server is in communication with the first originating communication device via a pathway using IP addressing.

30. The method according to claim 22, wherein the screener is configured to receive and act upon the first IP addressed data and the second IP addressed data.

31. The method according to claim 22, wherein the first IP addressed data includes connection initiator identifying information.

32. The method according to claim 31, wherein the connection initiator identifying information includes an AIN number.

33. The method according to claim 31, wherein the connection initiator identifying information includes customer information.

34. The method according to claim 22, wherein the first IP addressed data and the second IP addressed data each further include outbound number information corresponding to a destination of a communication.

35. The method according to claim 22, wherein the another phone network includes a public switched telephone network.

36. The method according to claim 22, wherein the first originating communication device is a standard telephone device capable of communicating voice over standard phone lines.

37. The method according to claim 22, wherein the first originating communication device is standard fax equipment.

38. The method according to claim 22, wherein the first originating communication device includes a touchtone device, and wherein the first payload data includes DTMF signals.

39. The method according to claim 22, wherein the second originating communication device is a computer with an Internet connection.

40. The method according to claim 22, wherein the targeted destination input is operable upon the first originating communication device getting access to the first server.

41. The method according to claim 22, wherein the first server and the second server each include a respective destination numbered determination mechanism configured to determine a destination number of a given call placed by a respective originating communication device.

* * * * *